United States Patent [19]
Rippel

[11] 3,808,481
[45] Apr. 30, 1974

[54] COMMUTATING CIRCUIT FOR ELECTRICAL VEHICLE

[75] Inventor: Wally E. Rippel, Hollywood, Calif.

[73] Assignee: Electrio Fuel Propulsion Corporation, Feindale, Mich.

[22] Filed: Apr. 14, 1972

[21] Appl. No.: 243,941

[52] U.S. Cl.................... 318/139, 318/341, 290/50, 318/138
[51] Int. Cl. ............................................ H02p 1/00
[58] Field of Search ....... 318/138, 139, 341; 290/50

[56] References Cited
UNITED STATES PATENTS

| | | | |
|---|---|---|---|
| 3,316,417 | 4/1967 | Tolmie | 318/139 X |
| 3,686,549 | 8/1972 | Winebrener | 318/139 |
| 3,694,715 | 9/1972 | Van Der Linde | 318/319 |
| 3,621,929 | 11/1971 | Oberthur | 318/139 |
| 3,716,767 | 2/1973 | Kuriyama et al. | 318/139 |
| 3,321,688 | 5/1967 | Van Delden | 318/138 |
| 2,718,848 | 2/1973 | Hines | 318/139 |
| 3,437,826 | 4/1969 | Kelley | 318/341 |
| 3,349,309 | 10/1967 | Dannettell | 318/341 |

*Primary Examiner*—G. R. Simmons
*Attorney, Agent, or Firm*—Cushman, Darby & Cushman

[57] ABSTRACT

A circuit and system particularly for controlling the current flow to a load, such as an electric motor which propels a vehicle along the earth's surface. One specific chopper circuit includes two main current carrying SCRs which are each serially connected with an inductance. Two pairs of commutating SCRs are each connected between the anode and cathode of the main SCRs, respectively, via a single capacitance. The main SCRs are alternately rendered conductive and thereafter non-conductive by connecting the capacitor to the conducting main SCR via a pair of commutating SCRs to back-bias the conducting SCR and produce an output signal in which all odd mode harmonics are eliminated, while the even mode harmonics are significantly reduced, thus considerably improving the form factor of the load current. The circuit finds particular utility in a "3 in 1 system" in which a single chopper circuit is used to control the flow of electrical energy from the batteries to the motor for propelling the vehicle, the flow of electrical energy to the batteries from the motor during regenerative braking, and the flow of electrical energy to the batteries from an exterior source during recharging.

50 Claims, 30 Drawing Figures

COMMUTATING CIRCUIT FOR ELECTRICAL VEHICLE

BRIEF DESCRIPTION OF THE PRIOR ART AND SUMMARY OF THE INVENTION

The invention relates to a unique circuit, particularly for controlling the current delivered from one or more electrical energy storing devices to an electric motor which propels a vehicle along the surface of the earth and to a control system in such an electrical vehicle for controlling the recharging of the energy storage devices from an external voltage source, recharging of the energy storage devices through regenerative braking and/or controlling transfer of electrical energy from the storage devices to the electric motor to drive the vehicle.

Around the beginning of the Twentieth Century, three quite different types of automobiles were locked in a fierce competition for the fledgling automobile market — the steam driven automobile, the electric powered automobile and the gasoline powered automobile. The gasoline powered automobile emerged the victor and since has grown to be the center of an enormous industry, and indeed an entire way of life. The problems which caused the electric automobile then to fall behind have still not yet been completely overcome. The weight, range, speed, acceleration and recharging time of electrically powered vehicles, although improved somewhat, are still somewhat less than totally competitive with similar characteristics in gasoline automobiles. However, the virtues of the electric automobile, such as quietness, lack of waste pollutants and inexpensive operation are such that even with its drawbacks the electric automobile is beginning to carve a niche in the enormous automobile market.

The drawbacks of electric automobiles have been mitigated somewhat by the use of improved lead acid storage batteries as well as radically different storage batteries. In addition, techniques have been developed for conserving the energy stored within the batteries and for transferring that energy within the vehicle as efficiently as possible. One such technique now in use involves recovering a portion of the kinetic energy of the vehicle which would otherwise be dissipated in braking by regeneratively braking the vehicle. This technique is described in U.S. Pat. No. 3,530,356 by Robert R. Aronson.

There are a number of ways in which the transfer of energy from storage batteries or the like to the electrical motor which powers the vehicle can be effected. According to the control system which is described in the above mentioned Aronson U.S. Pat. No. 3,530,356, a number of storage batteries are interconnected by switches which are operated by relays to connect the batteries in different serial and parallel configurations to apply a voltage to the electric motor powering the vehicle which varies as a function of the physical position of the accelerator pedal or other manual control device.

Another technique for controlling the amount of electrical energy transfered from storage batteries to the motor and the current or voltage which is thus applied is to connect a fixed voltage to the motor, but to periodically connect and disconnect that voltage from the motor so that the average current which flows through the motor windings or the voltage across them can be varied as a function of accelerator pedal position or some other manual control. The U.S. PAT. No. to Rippel. entitled SCR CHOPPER CIRCUIT, 3,641,364 describes, in general, one such an arrangement which has been found to be particularly useful in electrical vehicles. In the circuit described in the above mentioned Rippel patent, an SCR is connected serially between a D.C. power source and a load, such as an electrical motor. The SCR is turned on and off periodically by a control circuit to produce a commutated, pulsating voltage which is applied to the load.

The present invention relates in part to a specific chopper circuit which has been developed and which finds particular advantage in a multiple chopper circuit for use in an electrical vehicle. The invention further relates to a system for use in an electrical vehicle whereby one chopper circuit can be used to control three different energy transfer functions in the vehicle — the transfer of energy from the motor to the batteries during regenerative braking, the transfer of energy from the batteries to the motor during normal operation and the transfer of energy from an exterior source to the batteries during recharging.

The specific circuit of this invention, as described in detail below for use in such a multiple chopper arrangement and a "3 and 1" system, is comprised of two main current carrying SCRs which are serially connected with an inductance. Two pairs of further SCRs are each connected via a single capacitor between the anodes and cathodes of the two main SCRs. The two main conducting SCRs are alternately rendered conductive to permit current flow through the inductance connected in series with it and to complete a current path between the vehicle storage batteries and an electric motor for either regeneratively charging or driving the motor or between the storage batteries and an exterior voltage source. At a time following the initiation of conduction by one of the two main SCRs, the pair of SCRs connected between the anode and cathode of the conductive SCR by the capacitor are themselves rendered conductive to connect the capacitor between the anode and cathode of the conducting SCR and to back bias the SCR, driving it into non-conduction.

A given time after firing the first main SCR, the second main SCR is fired by applying an appropriate signal to its control gate. At an appropriate time after the second SCR is fired, the pair of SCRs connected by the capacitor between its anode and cathode are rendered conductive to apply the charged capacitor across that SCR, back biasing the second SCR which is likewise rendered nonconductive. This alternate firing of the main two SCRs continues, producing an output signal in which all the odd mode harmonics of the load current are eliminated while the even mode harmonics are significantly reduced, thus considerably improving the form factor of the output current applied to the load. This is a particularly significant factor in electrical vehicles where the efficiency of energy transfer is of vital importance. Since both odd and even harmonics are reduced at the chopper input, the power source runs more efficiently.

As mentioned above, this unique chopper finds particular utility in an electrical vehicle in controlling all of the electrical energy flow within the system by means of electronic logic described in detail below. Relays or similar switching devices can be employed to switch the chopper circuit into regenerative recharging, recharging from an external source and motor driving modes.

A number of patents in the past describe systems in which SCRs are alternatively fired to conduct current through a load or the like. The U.S. Pat. No. to Scarpelli 3,246,113 describes an arrangement with 3 SCRs connected in parallel to a gap. The SCRs are fired in sequence and the firing of each causes the preceding SCR to be back biased and turned off. The U.S. Pat. No. to Long et al., 3,242,352, shows a chopper circuit with two SCRs connected in parallel to receive a D.C. voltage and produce a pulse train. A number of other patents in the prior art show similar arrangements.

The inventor of this application, in a speech given in Apr. 1969 at the "Region Sixth Conference Resources Roundup," described the possibility of using SCRs in a multiple chopper circuit with the SCRs fired alternatively to improve the characteristics of the signal applied to the load. An article based on that speech was subsequently part of a book sold at the conference.

An article, entitled NEW ELECTRICS MAKE PERFORMANCE BREAKTHROUGHS by Joseph P. Zmuda, which appeared in POPULAR SCIENCE, Feb. 1971, pages 55 and 56, describes an electric car and discusses the advantages of a "3–1" dual chopper in such an electric car, employing two silicon controlled rectifiers which allow no step, infinitely variable current voltage selection with the accelerator pedal. The device is described as containing a regenerative braking feature.

The novel invention of this application is further described in an article which appeared in the IEEE TRANSACTIONS on Vehicular Technology, Vol. VI-20, No. 2, May 1971, entitled DUAL SCR CHOPPER AS A MOTOR CONTROLLER FOR AN ELECTRIC CAR by the inventor of this application and also in a thesis by the inventor of this application which is available in the Electrical Engineering Department of Cornell University and which was approved July 30, 1971. The disclosure of this IEEE article and thesis are explicity incorporated herein by reference.

DETAILED DESCRIPTION OF THE DRAWINGS

Figure 1:
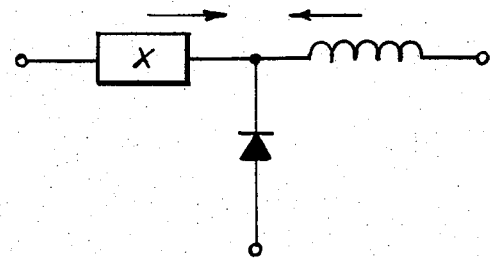
FIG. 1 shows an elementary chopper circuit with an inductor diode and switch.

Reference is now made to FIG. 1 which depicts a basic chopper circuit which can be used to control the flow of electrical energy from a battery or the like to a load, for example, a motor in an electric vehicle. Block X represents an electronic switch such as a power transistor or a commutated SCR and in this circuit, power is controlled by regulating the percentage of time that switch X is conductive. Free wheeling diode D conducts when switch X is turned off and serves as a low loss path for load currents that are kept in motion as a result of inductor L. The inductor L is provided in series with the load to reduce ripple components of the load current.

Figure 2:
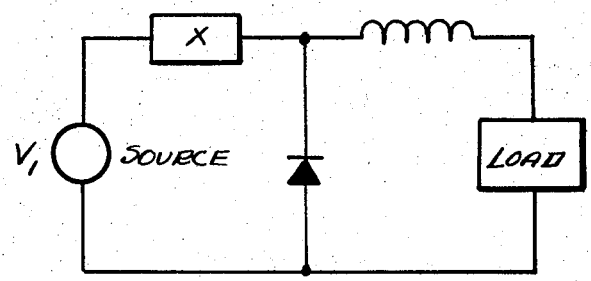
FIG. 2 shows the elementary chopper of FIG. 1 connected in the common diode configuration or "D-Chopper."

The source and load can be connected to the basic chopper shown in FIG. 1 in at least three ways. The first of these ways is shown in FIG. 2 and this arrangement henceforth is referred to as the "common diode" configuration. In this configuration, the load is connected to the inductor as shown and the average output voltage ranges between zero and the average of the input voltage as the output voltage increases with the percentage of time that switch X is conductive. Further, the input-output ratios of average current range between zero and unity as the time that the switch X is conductive is increased between zero and unity. The common diode configuration is most frequently used and finds general application where D.C. power control is desired, including D.C. supply regulators and D.C. motor controllers.

Figure 3:
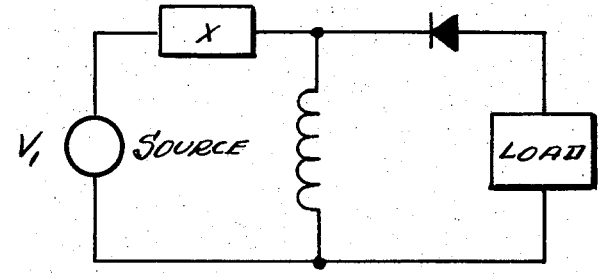
FIG. 3 shows the elementary chopper circuit of FIG. 1 connected in the common inductor configuration or "L-Chopper."

FIG. 3 illustrates another configuration termed the "common inductor" configuration. In this arrangement, the average output voltage is negative and the ratio between the output voltage and the magnitude of the average input voltage ranges between zero and an arbitrarily high number, which depends on the Q of the inductor, diode losses, etc., as the percentage of time that the switch X is conductive ranges between zero and one. Further, the input-output ratios of average current magnitudes range between zero and arbitrarily high number as the percentage of conduction time ranges between zero and unity. All of the energy supplied to the load in the common inductor configuration is stored energy from the inductor. For this reason, inductor losses can be higher than in the common diode configuration and the common inductor configuration is seldom used. It is, however, a satisfactory mode for energy transfer between batteries of different voltages.

Figure 4:
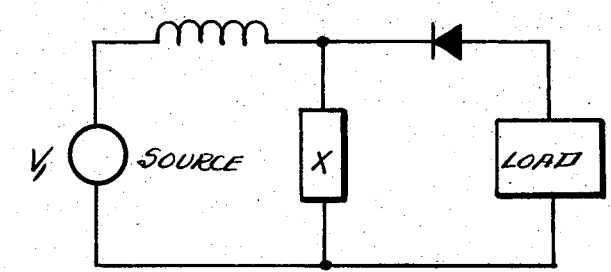
FIG. 4 shows the elementary chopper circuit of FIG. 1 connected in the common switch configuration or "X-Chopper."

The "common switch" configuration illustrated in FIG. 4 is one in which the average output voltage is negative. The average input voltage must necessarily be negative and the ratio between the magnitude of average output and input voltages range between unity and a high number as the percentage of conduction time ranges between zero and unity. Only part of the outout energy is stored from the inductor. The common switch configuration finds application particularly in motor braking schemes, and transformerless voltage boosting power supplies. Its overall efficiency is generally better than the common inductor configuration and in addition, the input and output current form factors are also better.

Figure 5:
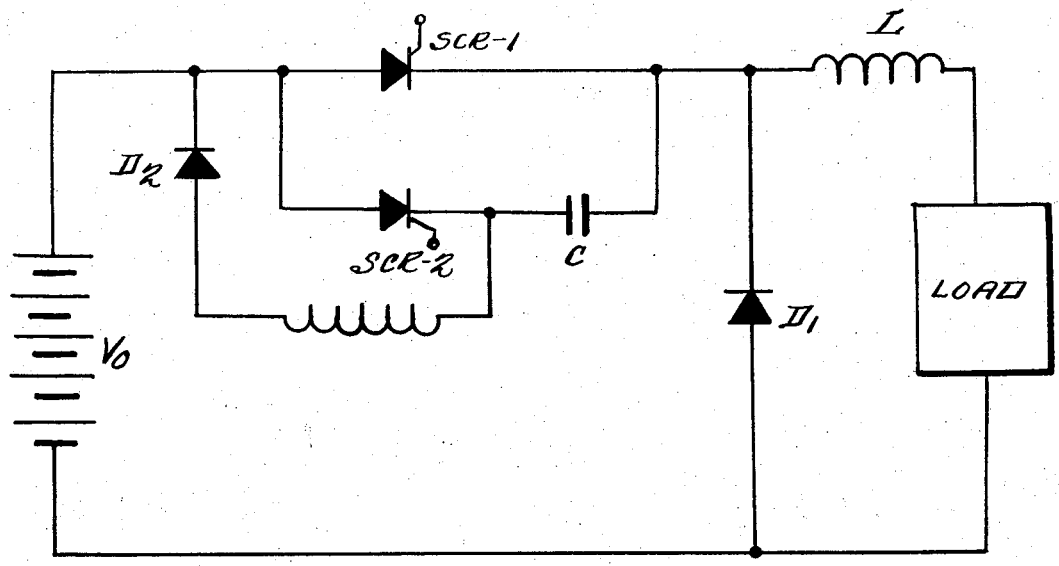
FIG. 5 shows a conventional SCR chopper circuit.
Figure 6:
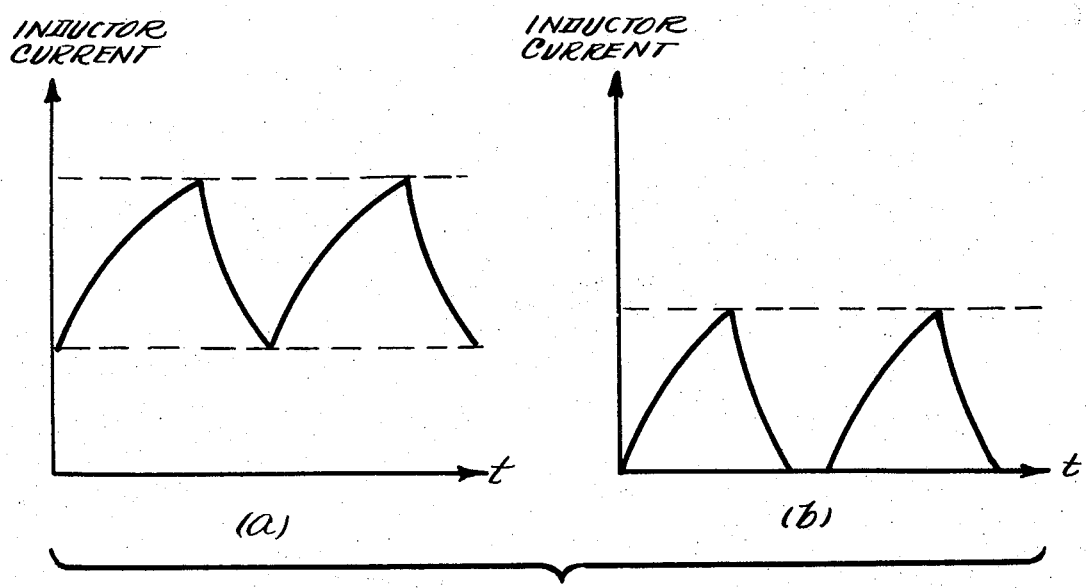
FIG. 6 shows the current waveform through the inductor of a conventional SCR chopper circuit such as shown in FIG. 5 in both over-critical operation in which the inductor current is non-zero at all times during the cycle, and under-critical operation in which the inductor current is zero during some finite portion of the cycle.

Reference is now made to FIG. 5 which shows a conventional SCR chopper circuit in the common diode configuration or "D-Chopper" and to FIG. 6 which illustrates the current waveforms through the inductor during "over-critical" and "under-critical" operation. When the current of the switching frequency and the average load current is sufficiently high, current flows through the inductance L and the load over the entire cycle of operation and operation is said to be over-critical, i.e., the inductor current is non-zero over the whole cycle. During over-critical operation, the average output voltage is equal to the input voltage times the duty cycle of the main conducting SCR. In these respects, the elementary chopper acts something like a step-down D.C. transformer, with the turns ratio equal to the duty cycle.

For smaller products of load current and switching frequencies, the load current goes to zero during a finite portion of the cycle and operation is said to be undercritical. In under-critical operation, the chopper still acts as a step down transformer, except that the average output voltage is now a function of the load current. A full analysis of the waveforms which are produced by the common diode configuration during both under-critical and over-critical operation is included in the above mentioned thesis, the disclosure of which is explicity incorporated herein by reference.

In the convenional SCR chopper circuit which is shown in FIG. 5, capacitor C is initially charged, with side $b$ positive an amount $V_0$ with respect to side $a$. The cycle begins with the firing of $SCR_1$ by a conventional control circuit such as described in detail below. A short time thereafter when turn off is desired, $SCR_2$ is fired which effectively shunts the capacitor C around $SCR_1$, causing $SCR_1$ to be momentarily reverse biased while capacitor C discharges through the load. If capacitor C has a discharge time which is sufficient to maintain $SCR_1$ reverse biased until recovery, $SCR_1$ will reamin non-conductive until refired by the application of a suitable pulse to the gate thereof. During commutation, capacitor C gains a reverse charge with side a positive $V_0$ with respect to side $b$. When $SCR_1$ is refired, the charge on capacitor C will reverse by the resonant action of inductor $L_2$ and diode $D_2$ which are connected between the anode and cathode of $SCR_2$ as illustrated, and prepare the circuit for another cycle of operation. Energy flow from the power supply $V_0$ to the load is controlled by regulating the duty cycle, which is equal to the interval between the firing of $SCR_1$ and the firing of $SCR_2$, divided by the total cycle time.

While circuits of the type generally illustrated in FIGS. 1–5 have found practical applications, there are a number of problems associated with the use of such chopper circuits. The first of these problems relates to the limit of commutation. If peak current is to be successfully commutated using a main SCR, such as $SCR_1$ in FIG. 5 recovery turn off time $T_{off}$, capacitor C must have minimum capacitance of $T_{off} I_T/V_0$. Typically, a capacitor of this rating is as expensive as the main SCR itself. In addition, due to the finite Q of inductor $L_2$ in FIG. 5 (which is usually less than 10), a substantial portion of the capacitor C's energy is lost each cycle. These losses account for a significant fraction of the total power which is lost in the chopper itself. The third problem is that considerable levels of ac current components flow through the various branches of the circuit illustrated in FIG. 5. These components, while they do not contribute to energy transfer, do nontheless add to the small rms losses within the chopper.

In many cases, the chopper induced losses are of even greater effect than the direct losses. On one hand, the chopping action induces losses within the power source. In the case of a battery-operated vehicle, this means additional battery heating and decreased usable battery output, which in turn means decreased range and decreased performance for the electrical vehicle. On the other hand, the presence of large ripple components in the chopper output causes increased rms losses at the motor, compounded by eddy and hysteresis losses. Induced motor losses are particularly bad because motors used with such choppers must be derated to prevent excess heating.

Figure 7:
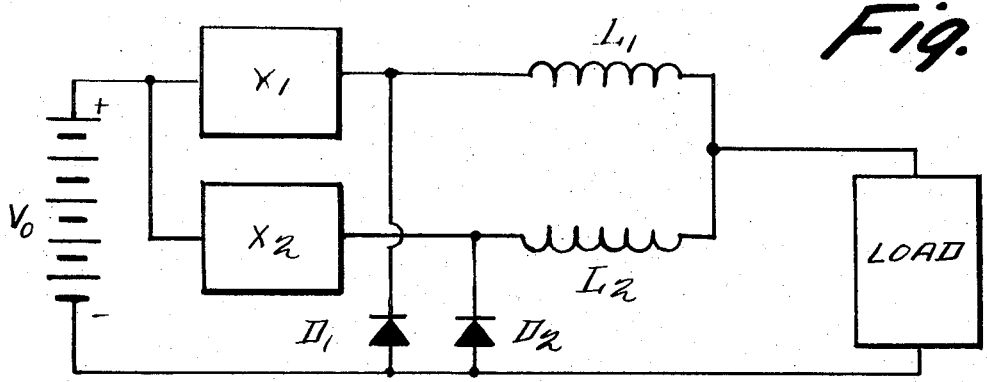
FIG. 7 shows a block diagram of a dual chopper circuit connected in the common diode configuration.
Figure 8:
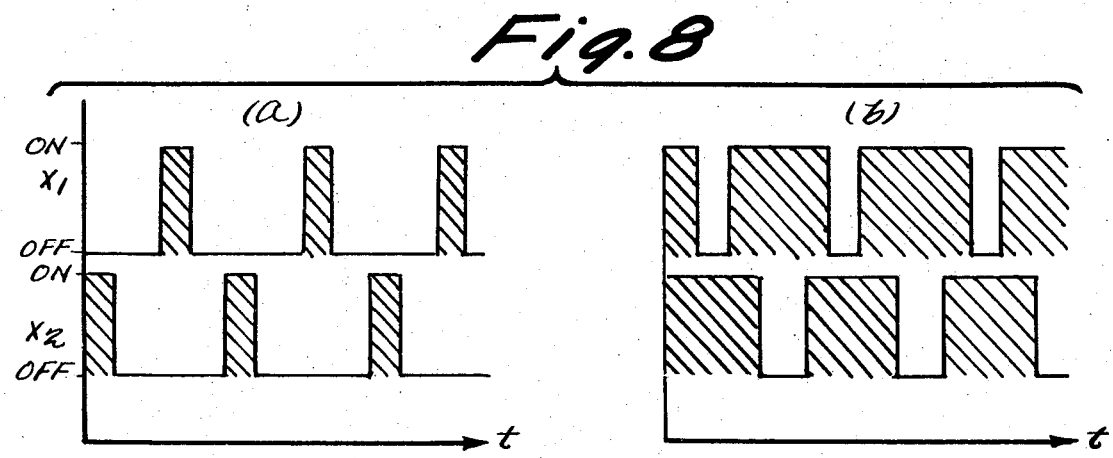
FIG. 8 shows the conduction intervals for the dual chopper cirucit shown in FIG. 7 for both a small and large duty cycle.

FIG. 7 shows a circuit developed by the inventor of this application which significantly reduces the above mentioned drawbacks of conventional SCR chopper arrangements such as shown in FIG. 5. This circuit is simply comprised of two chopper circuits essentially connected in parallel and alternately fired as shown in FIG. 8. Of course, if the turn-off times of the two choppers $X_1$ and $X_2$ were identical, the circuit of FIG. 7 would behave in the same fashion as the circuit of FIG. 5. If, however, the $X_2$ switching times lags the $X_1$ switching time by exactly a half period, as shown in FIG. 8, all of the even load of current harmonics are eliminated while odd mode harmonics are significantly reduced. In like manner, both even and odd harmonics are reduced at the chopper input which enables the power source to run more efficiently. The dual chopper circuit shown in FIG. 7 was discussed and illustrated in the above mentioned speech and book which was made available following the IEEE RESOURCES ROUNDUP in Apr. 1969.

Figure 9:
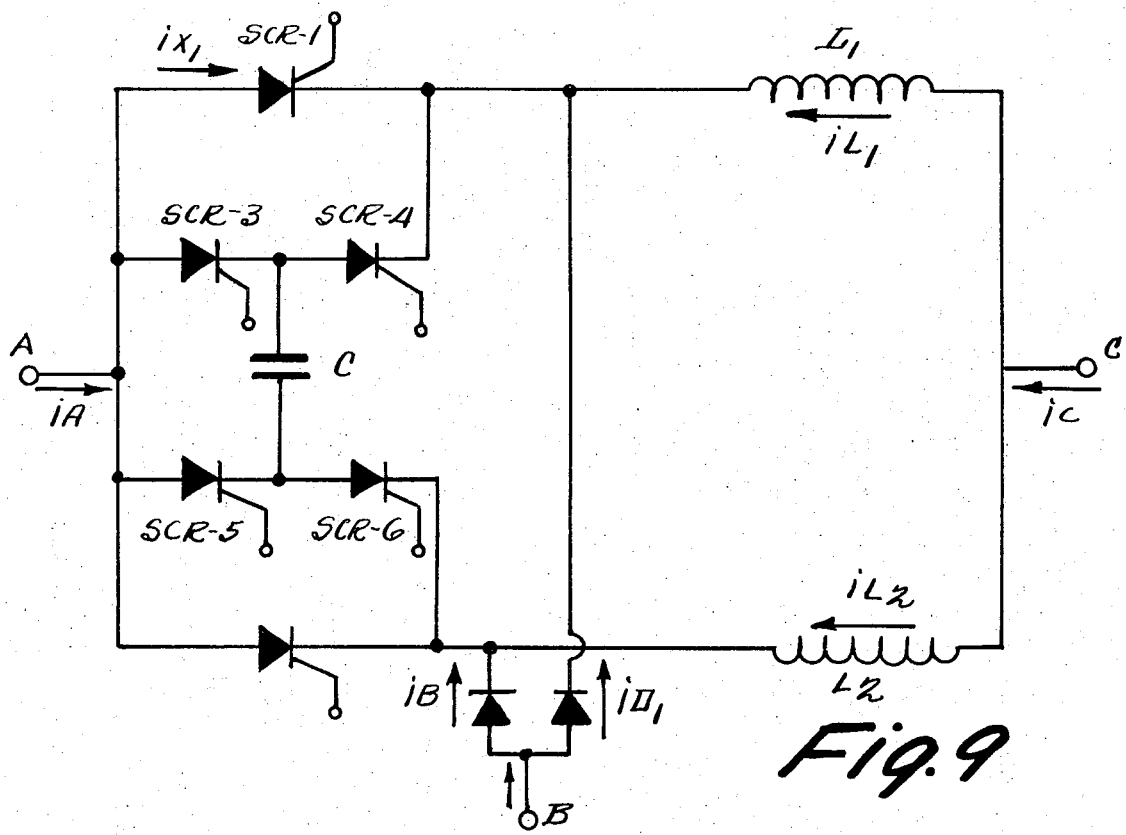
FIG. 9 shows a circuit diagram of the basic dual chopper circuitry with two main SCRs, two pairs of commutating SCRs, and a capacitor which is periodically switched by the commutating SCRs to alternately turn off the two main conductive SCRs.

FIG. 9 shows one specific circuit which was developed and which has been found to be particularly satisfactory in eliminating the above mentioned drawbacks of conventional chopper circuits. The circuit illustrated in FIG. 9, in addition to having the advantages already discussed which result from a multiple chopper arrangement, employs a bridge type commutation circuit that is of inherently high efficiency. Furthermore, for a given kVA rating, the dual chopper illustrated in FIG. 9 requires only slightly more than half the capacitance used in conventional SCR choppers. Accordingly, there is a corresponding cost and weight savings. Although the dual chopper of FIG. 9 uses a total of six SCRs and two free-wheel diodes, these components, because of their reduced current ratings, typically cost less than the two or three SCRs and one or two diodes which are used in conventional circuits such as illustrated in FIG. 5.

Operation of the novel circuit which is shown in FIG. 9 can be initiated by charging capacitor C by simultaneously firing $SCR_3$ and $SCR_6$ so that current flows from battery $V_0$ through $SCR_3$ and $SCR_6$ to capacitor C and diode $D_2$. When capacitor C has been charged essentially to voltage $V_0$, $SCR_1$ may thereafter be fired. As described in detail below, it may be desirable to alternately charge capacitor C several times by firing the commutation SCRs several times before main $SCR_1$ and $SCR_2$ are operated.

Figure 10:
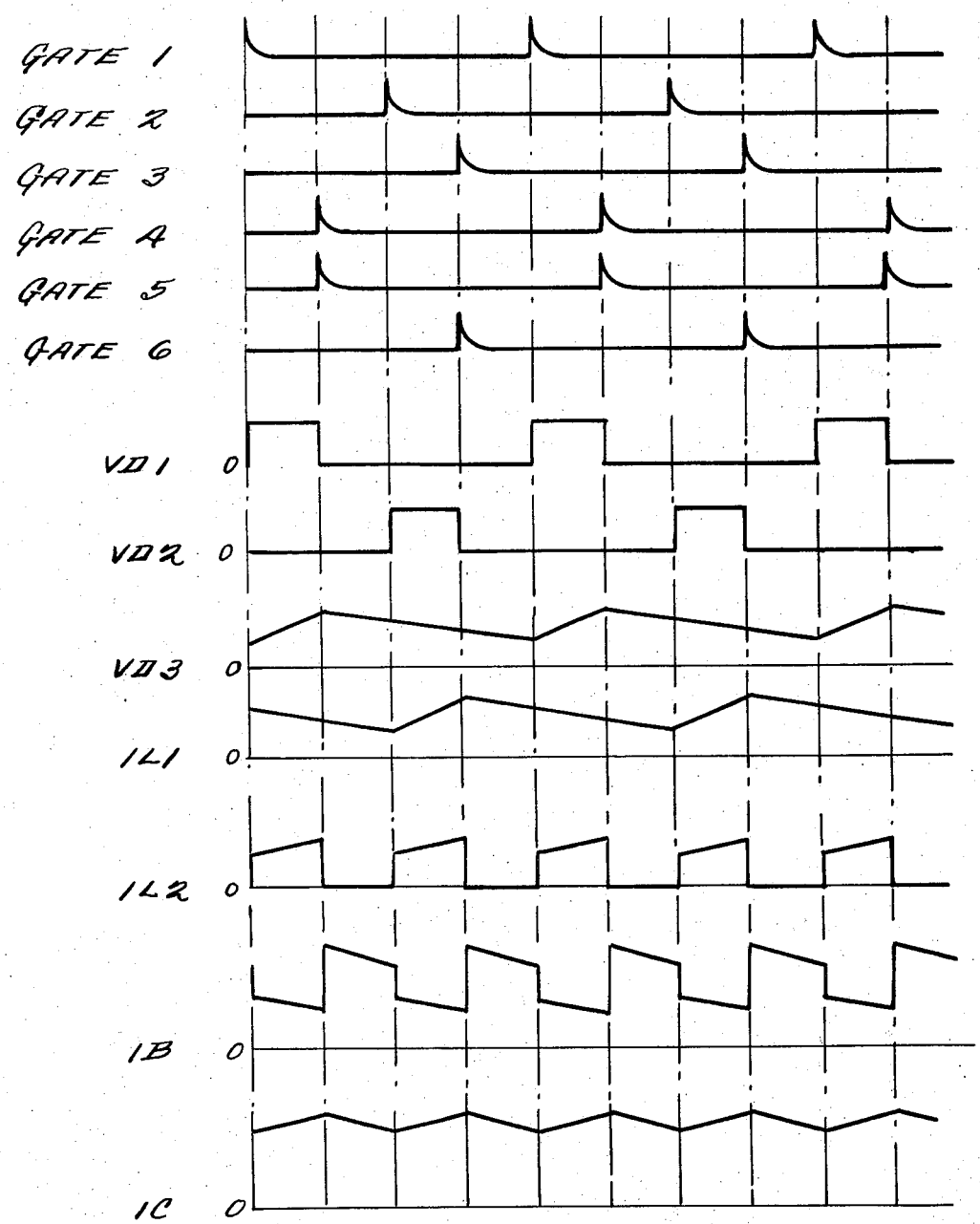
FIG. 10 shows the dual chopper waveform produced by the circuit of FIGS. 9 and 11.

$SCR_1$ can be turned off at any time after firing by rendering $SCR_5$ and $SCR_4$ conductive so that current flows through $SCR_4$ and $SCR_5$ until capacitor C attains a reverse voltage equal to $V_0$. This back biases $SCR_1$ which is thus rendered non-conductive. Having successfully commutated $SCR_1$, the capacitor is now ready to commute $SCR_2$, which has been rendered conductive in the same fashion as $SCR_1$ during its half of the cycle. When $SCR_3$ and $SCR_6$ are fired, capacitor C back biases $SCR_2$ in the same fashion as $SCR_1$ was previously back biased, turning off $SCR_2$ and leaving capacitor C with its initial charge and ready to repeat the cycle. Power flow is thus controlled simply by varying the time interval during which $SCR_1$ and $SCR_2$ are conductive. FIG. 10 illustrates the timing and waveforms which are produced by the basic circuit illustrated in FIG. 9.

During operation, $SCR_1$ and $SCR_2$ and the dual chopper circuit illustrated in FIG. 9 experience low values of positive dV/dt as limited by the commutation capacitor C. The highest values of dV/dt will, of course, occur when load current is maximum. The maximum operating current is in turn limited by the size of capacitor C, the comutation capacitor. Since $I_{max}$ (the peak current per side before commutation failed) is equal to $V_1 C/T_{off}$ and since dV/dt is equal to $I_{max}/C$, it follows that the worse possible case of operating dV/dt can be no higher than $V_1/T_{off}$. If the highest input voltage is 350 volts (during recharge) and $T_{off}$, the turn off time of the SCR is 20 microseconds, which are representative practical values, dV/dt is equal to or less than 17 volts per microsecond. Since SCRs are available which have a rating of 200 volts per microsecond, it follows that the commutation will be lost due to inadequate circuit turn off time long before the dV/dt becomes significant.

Figure 11:
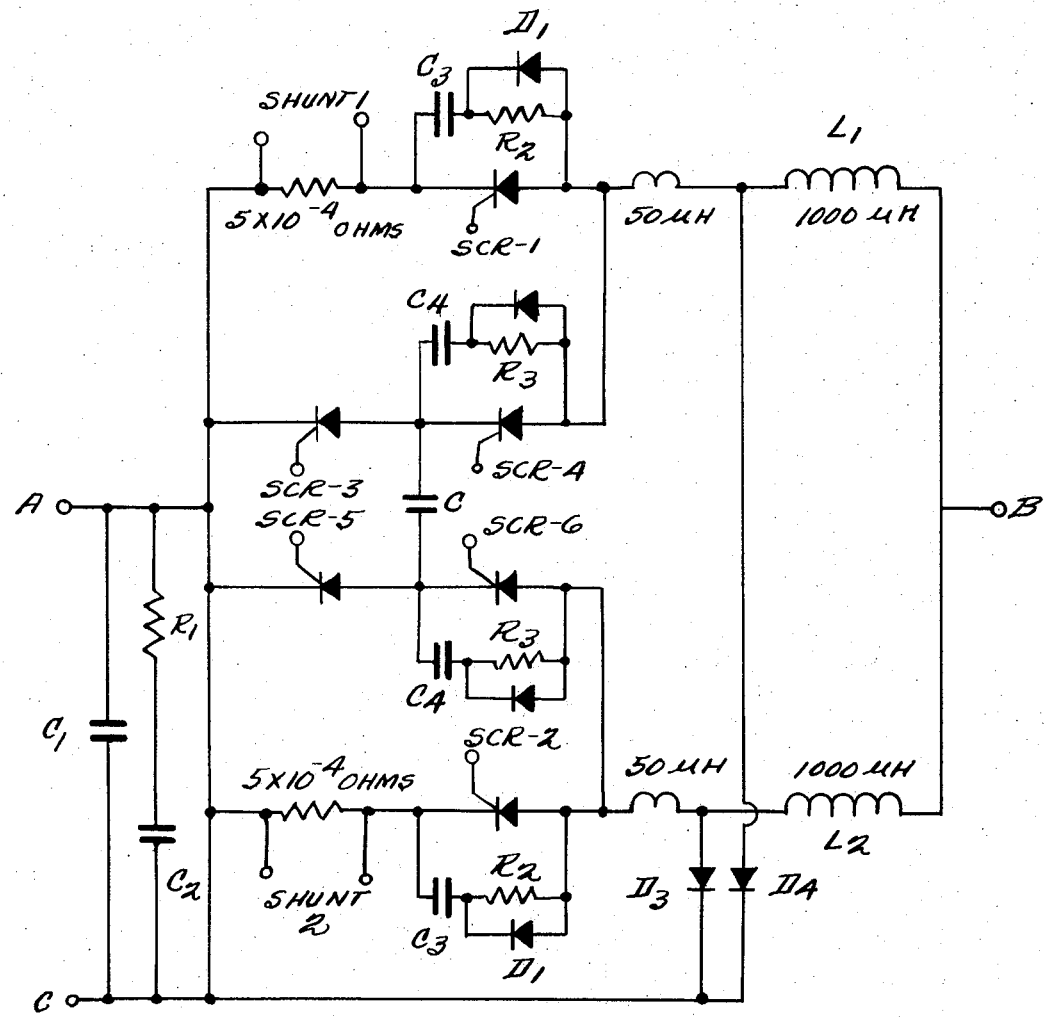
FIG. 11 shows a dual chopper circuit including snubbing and damping networks.

Nonetheless, a small snubber is useful to prevent $SCR_1$ and $SCR_2$ from break-over when the chopper input is suddenly energized. Since no currents are flowing through the free wheel diodes when chopper input is applied, the main inductors, which are shown as 1,000 microhenrys in the embodiment of FIG. 11, are active in limiting dV/dt. Thus, in the embodiment of FIG. 11, conventional snubber circuit comprising a capacitor serially connected to the parallel connection of a resistor and diode are connected between the anode and cathode of $SCR_1$ and $SCR_2$, as well as $SCR_4$ and $SCR_6$. The value of $C_3$ in the snubber was set at 0.1 microfarad, which is a value much larger than necessary. $R_2$ was chosen to e 10 K and it was determined that any resistance between 200 ohms and one megohm would be satisfactory.

Prior to firing, $SCR_3$ is forward biased. Upon firing, the sudden reduction in the anode voltage at $SCR_3$ results in a forward step voltage across $SCR_4$. Without sufficient snubbing, $SCR_4$ would break-over due to the sudden rise in anode voltage. By placing a snubber across $SCR_4$ as well as $SCR_6$, the voltage step generated by firing $SCR_3$ and $SCR_5$, respectively, is transferred across the dI/dt limiting inductor which in the embodiment of FIG. 11 is 50 microhenrys. Assuming overcritical operation, a safe value for the capacitance $C_4$ was found to be 0.5 microfarad and resistance $R_3$ was chosen to be 200 ohms. It was determined that any value of resistance for $R_3$ between 90 and 500 ohms would be satisfactory. It was further determined that 2-watt resistors for $R_2$ and 20-watt resistors for $R_3$ were sufficient.

$SCR_3$ and $SCR_5$ do not necessarily require snubbers since step voltages to the chopper are absorbed by the snubbers for $SCR_1$ and $SCR_2$. During operation, the only steep waveforms across $SCR_3$ or $SCR_5$ are in the reverse direction. Special non-inductive resistors are not required since the actual snubbing currents are carried by the diodes. The diode ratings of the snubber diodes were chosen to be commensurate with the SCRs being snubbed. In the embodiment actually used, the required voltage was 600 volts and diodes rated 500 milliamps, 5 amps peak were found to be satisfactory.

The currents through $D_2$ were found, however to be somewhat greater. When chopper operation is overcritical, $D_2$ currents are limited only by the 50 microhenry inductor in the embodiment of FIG. 11. A diode capable of withstanding 35 amp peaks and an RMS current of about 2 amps was found to be required, and in the system built three 750 milliamp diodes were paralleled with excellent results. be During the initial test, a considerable amount of high frequency transient noise was generated across the chopper input which, of course, was a battery. The noise capacitively coupled through to gate lines which resulted in occasional false firing, and also caused dV/dt break-over on the main SCRs despite snubbing. A large electrolytic capacitor was first bridged across the chopper input. However, because of the battery inductance associated with low battery internal resistance, addition of a large value capacitor caused ringing problems. By adding a one microfarad capacitor across the chopper input, the ringing frequency was reduced from about one megahertz to 25 kilohertz. Next, the 25 kilohertz transient was damped by adding a one microfarad, 5 ohms series combination. The results were excellent, and hence $C_1$ and $C_2$ were finalized at one microfarad 600-volt each, while $R_1$ was set at 5 ohms, 25 watts.

Figure 12:
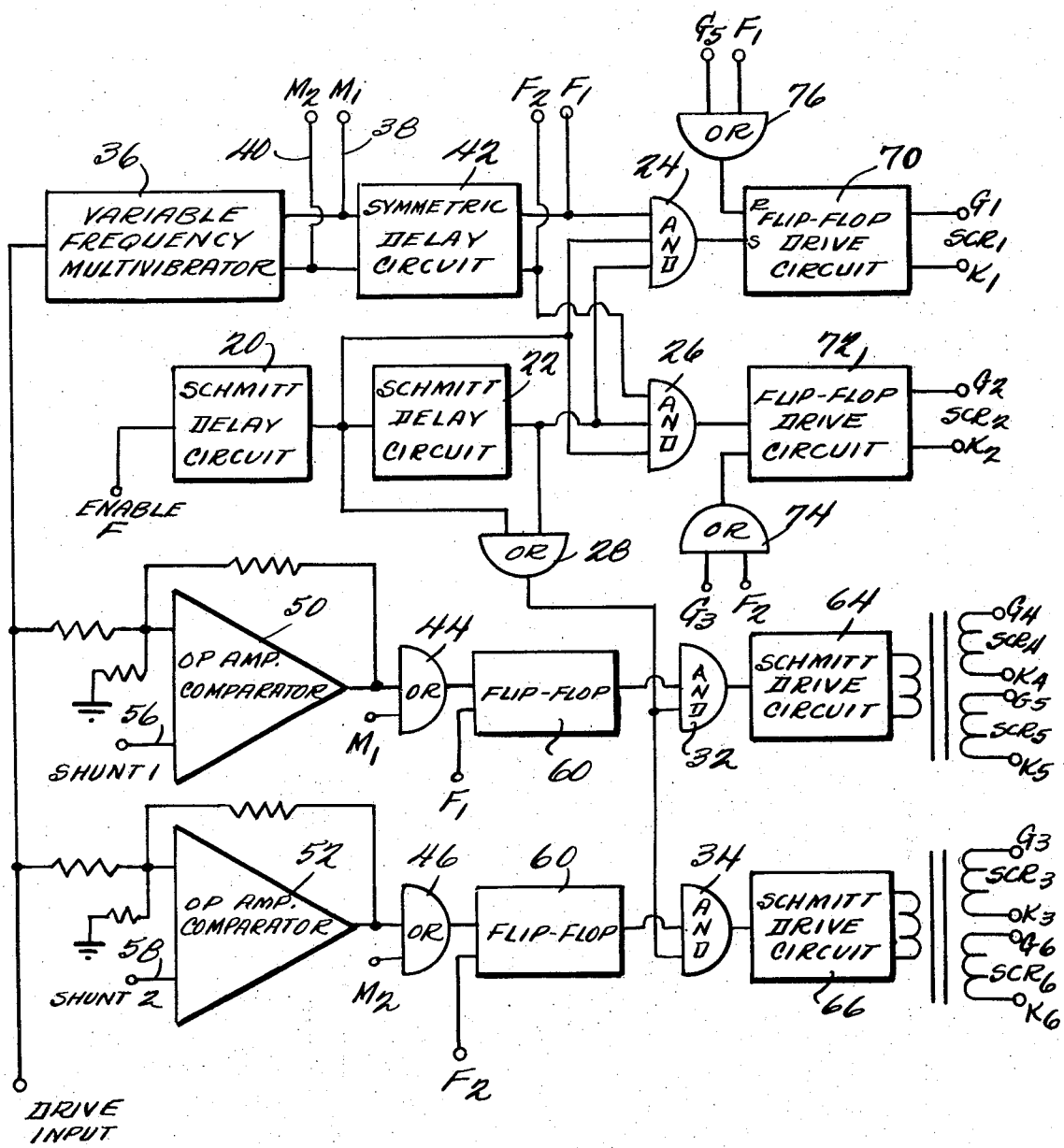
FIG. 12 shows a block diagram of a dual chopper firing circuit.
Figure 16:
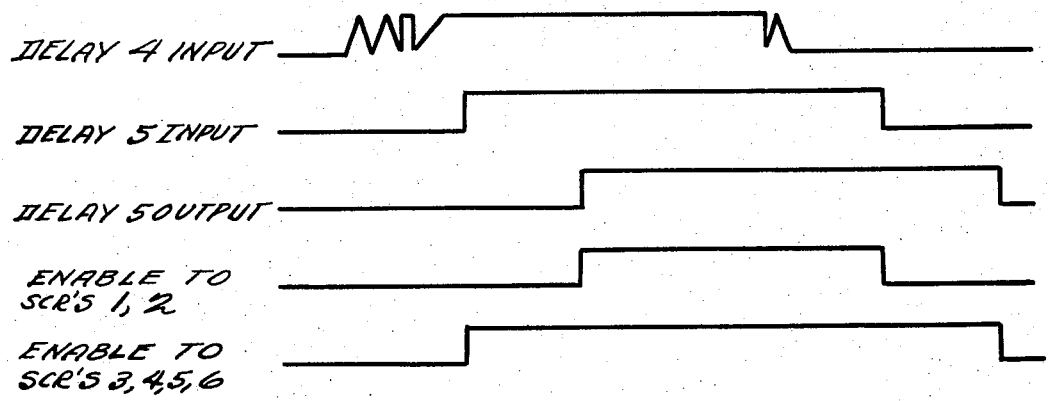
FIG. 16 shows the start up and shut down sequences of the dual chopper firing circuit illustrated in block diagram in FIG. 12.
Figure 22:
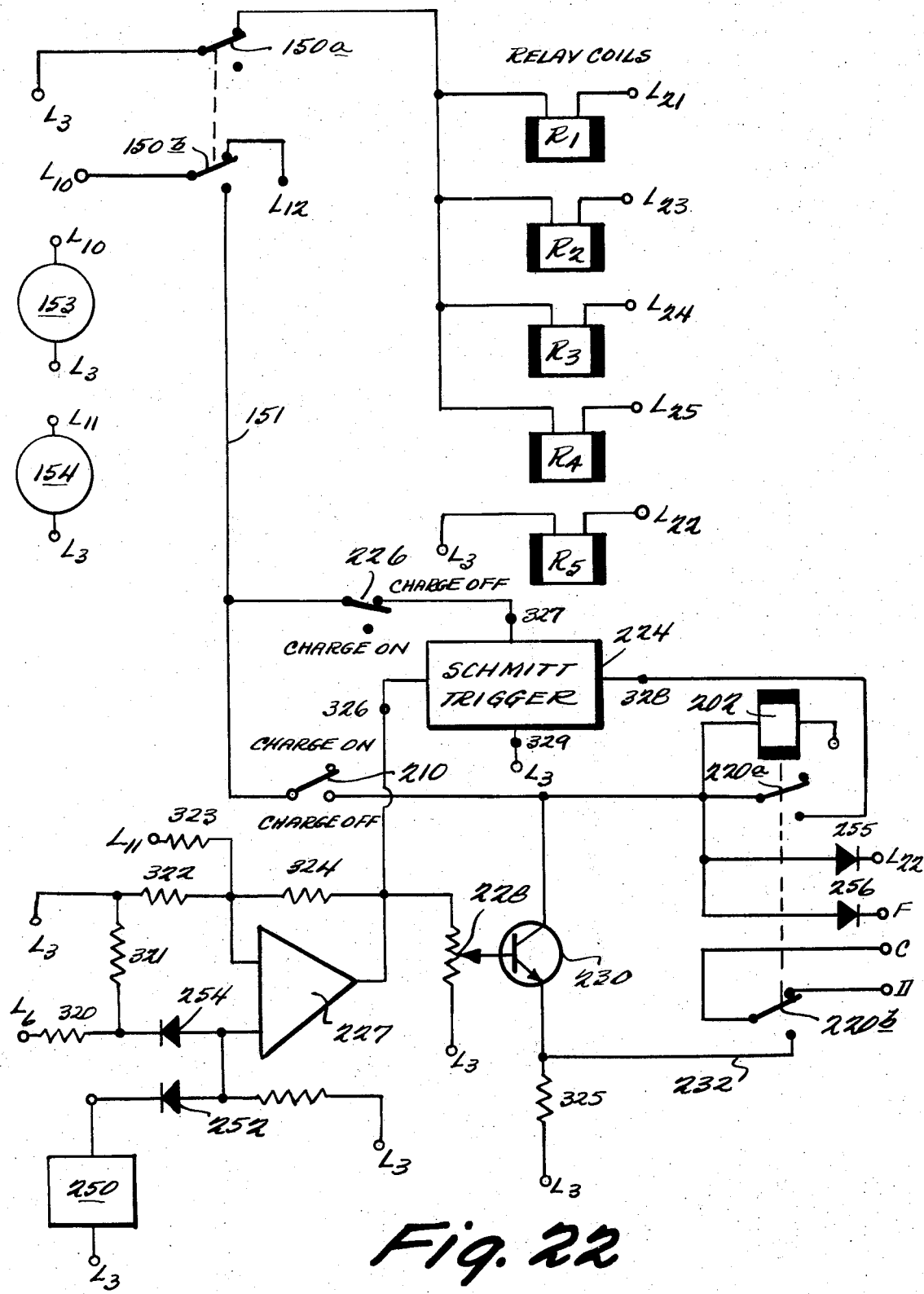
FIG. 22 shows a block diagram of the recharge logic for controlling the switches of FIG. 21.
Figure 23:
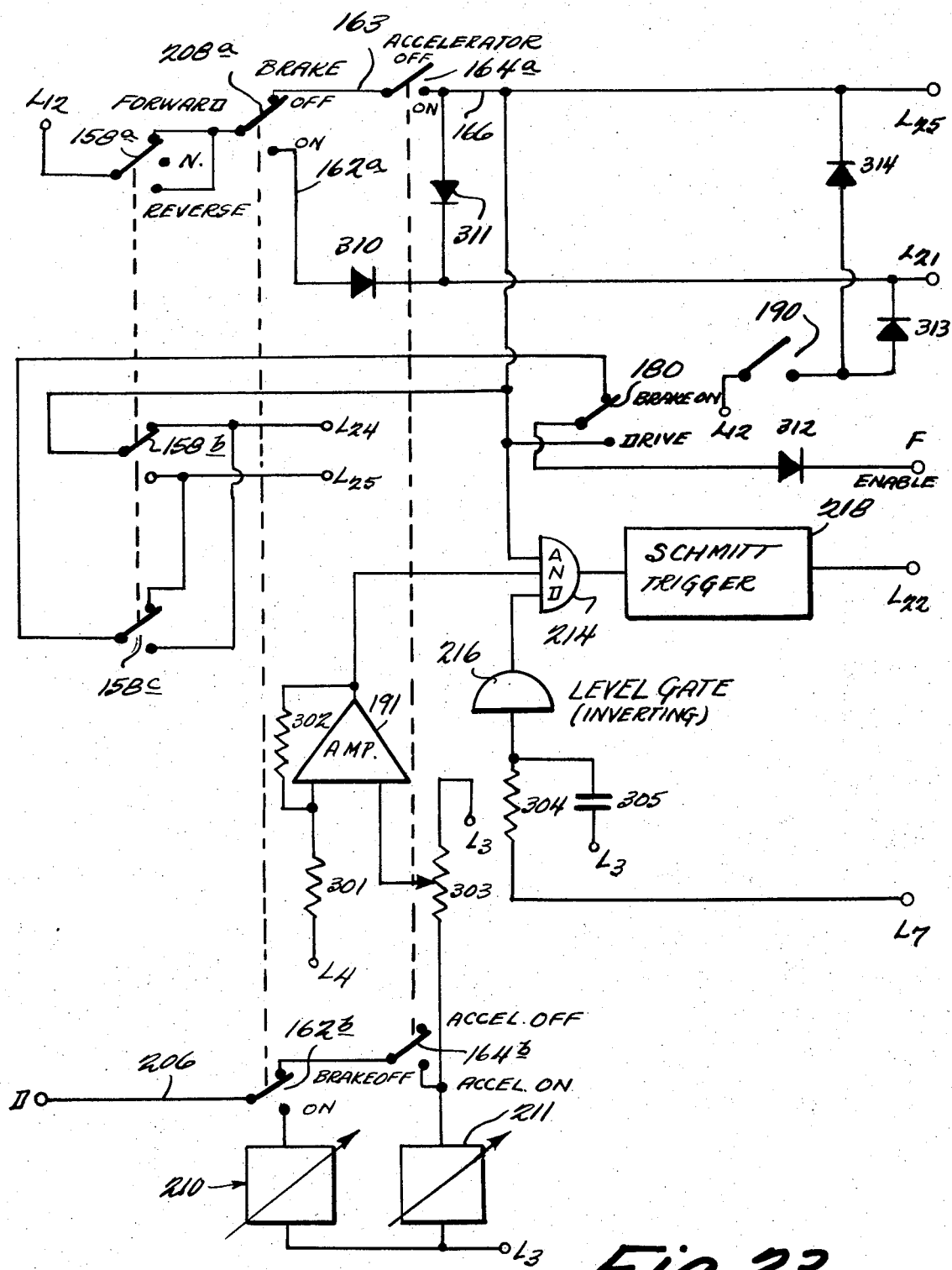
FIG. 23 shows a block diagram of the drive and brake logic for also controlling the switches in FIG. 21.

Reference is now made to FIG. 12 which shows, in block diagram, a firing circuit suitable for controlling a dual chopper such as shown in FIGS. 9 and 11. Initiation of the operation of the circuitry of FIG. 12 begins by the application of an enable signal F to the input to the Schmidt delay circuit 20. Enable signal F may be produced by logic circuitry controlling the recharging and driving of an electrical vehicle such as illustrated in FIGS. 22 and 23 as described in detail below. After a short delay of, for example, 10 milliseconds, to eliminate the effects of contact bounce and transients, Schmidt delay circuit 20, which is described in detail below, produces an output signal which is supplied to a second Schmidt delay circuit 22 which likewise after a delay of, for example, 10 milliseconds, produces an output signal which is applied to the inputs to AND gates 24 and 26 as well as to OR gate 28. The AND gates and the OR gates which are used in the firing circuit of FIG. 12 may be conventionally comprised of diodes. The delay provided by circuit 22 insures that the SCRs 3 and 6, as well as the SCRs 4 and 5, will be alternately fired several times before either main $SCR_1$ or main $SCR_2$ is fired. The start-up and shutdown sequences for the embodiment of FIG. 12 are illustrated in FIG. 16.

As described above, the basic operation of the dual cricuitry is based on the alternate conduction of $SCR_1$ and $SCR_2$. It is, of course, appreciated that any additional number of main conducting SCRs can be added, each similarly conducting for a portion of the cycle. In the arrangement of FIG. 12, the alternate conduction of $SCR_1$ and $SCR_2$ is under the control of the variable frequency multivibrator 36 which shifts back and forth between a first and second output state, alternately producing enabling signals on lines 38 and 40 which are applied to a symmetric delay circuit 42 as well as to the inputs of OR gates 44 and 46. A fixed frequency multivibrator can be employed instead of the variable frequency multivibrator 36 which is described in detail below although the advantages of using a variable frequency device are substantial and are explained in connection with the discussion of the detailed schematic of variable frequency multivibrator 36.

Two conventional operational amplifiers 50 and 52 are each connected to a drive input 54 which provides a signal which varies as a function of the output voltage or current which is desired to be supplied by the chopper circuit. In an electrical vehicle as described above, this input may be a voltage which varies as a function of the position of the acceleration pedal, and hence the desired current which is to flow to the electrical motor or motors in order to produce a given motor speed and hence, vehicle speed.

Operational amplifier 50 is also connected to a further input 56 which provides a voltage which varies as a function of the actual voltage or current which is being provided by the chopper circuit. Operational amplifier 52 is similarly connected to an input 58 to receive a similar signal with respect to the actual output conditions which are to be controlled by that operational amplifier.

The two outputs of symmetric delay circuit 42, which will be alternate, i.e., one will always be logical zero while the other is a logical one, are respectively applied to flip-flops 60 and 62. The application of a signal to flip-flop 60 from symmetric delay circuit 42 resets flip-flop 60, applying a logical zero input to AND gate 32. After Schmidt delay circuit 22 produces its output signal, AND gates 24 and 26 are alternately enabled by the output of Schmidt symmetric delay circuit 42 and symmetric delay circuit 20 to alternately fire $SCR_1$ and $SCR_2$ as symmetric delay circuit 42 shifts between its output states. $SCR_{1\ and\ SCR2}$ are fired by flip-flop drive circuits 70 and 72, respectively, which are described in detail below. At the time that $SCR_1$ is fired by flip-flop drive circuit 70, a signal is applied to flip-flop drive circuit 72 via OR gate 74 to reset that flip-flop in preparation for the next firing of $SCR_2$. Similarly, while $SCR_2$ is conductive, OR gate 76 provides a signal to flip-flop drive circuit 70 resetting that circuit in preparation for the next conduction of $SCR_1$.

As soon as the voltage supplied at input 56 to operational amplifier 50 and to input 58 of operational amplifier 52 exceeds the voltage supplied at 54 indicating the desired load value, the respective operational amplifiers 50 and 52 provide a signal to OR gates 44 or 46, respectively, which sets flip-flop 60 and 62, applying a signal to Schmidt drive circuit 64 or 66 and causing one of the pairs of commutation SCRs to fire and turn off the conducting main SCR–$SCR_1$ or $SCR_2$.

The other inputs to gates 44 and 46 are connected respectively to the outputs to the variable frequency multivibrator 36 so that if the conducting SCR has not been turned off by the end of its portion of the cycle, the signal supplied to OR gate 44 or 46 sets flip-flop 60 or 62 to cause the conducting $SCR_1$ or $SCR_2$ to be turned off. This function is termed the "last ditch turn-off" and insures that $SCR_1$ and $SCR_2$ cannot be conductive at the same time.

Figure 13:
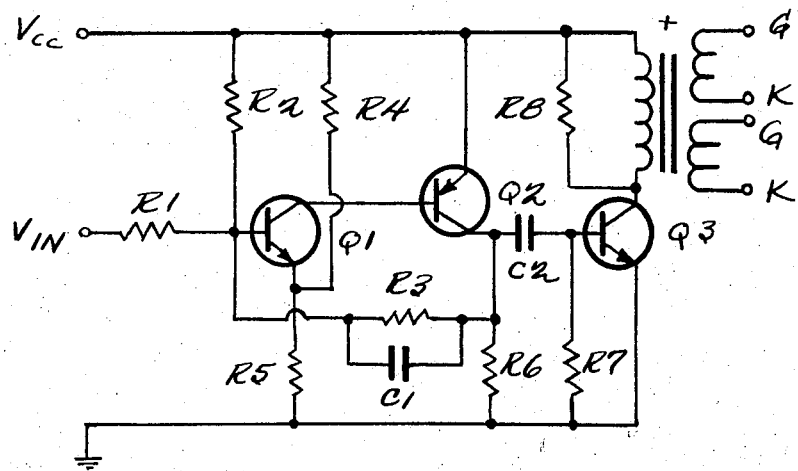
FIG. 13 shows a detailed schematic of the Schmidt drive circuit illustrated as a block in FIG. 12.

Reference is now made to FIG. 13 which illustrates a detailed schematic of the Schmidt drive circuit 64 which is shown in block in FIG. 12. This circuit was developed to generate a fast-rising low impedance pulse of about 15 microseconds duration. The circuit has a D.C. coupled input and exhibits hysteresis. Accordingly, the circuit triggers when the input obtains approximately a first voltage threshold, for example, 8 volts, and a second firing can not take place until the input voltage has first been reduced to a second level, for example, 5 volts. The resistances R4 and R5 in the schematic drive circuit of FIG. 13 constitute a voltage divider which provides a voltage of about one-half the supply voltage relative to ground at the emitter of transistor $Q_1$. With transistor $Q_2$ in its non-conductive state, the potential at the base of transistor $Q_1$ is determined by resistors $R_2$, $R_3$ and $R_6$. The values of these resistors are preferably chosen such that transistors $Q_1$ is reversed biased. When $V_{in}$ becomes sufficiently positive, transistor $Q_1$ is driven into its conductive state, driving transistor $Q_2$, in collector of transistor $Q_2$ is driving transistor $Q_3$ positive and also driving transistor $Q_1$ further into its conductive state by the action of resistor $R_3$ and capacitor $C_1$ which are feedback between the collector of transistor $Q_2$ and the base of transistor $Q_1$.

The signal to the base of transistor $Q_3$ remains while capacitor $C_2$ is charging via transistor $Q_2$. After capacitor $C_2$ has charged to the supply voltage, the drive to the base of the transistor $Q_3$ ceases and transistor $Q_3$ drops out of saturation. At this time, resistor $R_8$ absorbs the negative spike resulting from the rapidly falling current through the primary inductance of transformer T. When $V_{in}$ is somewhat less positive, transistor $Q_1$ is rendered non-conductive which in turn forces transistor $Q_2$ into its non-conductive state. This turn-off action is reinforced by resistor $R_3$ and capacitor $C_1$. With transistor $Q_2$ in its non-conductive state, capacitor $C_2$ discharges through resistors $R_6$ and $R_7$, preparing for the next cycle. Because of the short cycle, the power dissipation of transistor $Q_3$ is small and no heat sinking is necessarily required. The circuit has a rise time of about 0.1 microsecond and an output load line between 1 amp and 12 volts.

Initially, the circuit illustrated in FIG. 13 was used to fire main $SCR_1$ and $SCR_2$ as well as the commutation SCR – $SCR_3$, $SCR_4$, $SCR_5$, and $SCR_6$. Occasionally, it was noted that a false turn-off of either $SCR_1$ or $SCR_2$ would take place. These false commutations in turn caused momentary "drop out" in the chopper power level. It was found that for certain load duty cycle conditions, small fast reverse biasing transients would appear across $SCR_1$ and $SCR_2$ thus causing premature commutation and hence foreshortened duty cycles. Accordingly, a flip-flop drive arrangement, which is described in detail below, was instead chosen for driving $SCR_1$ and $SCR_2$.

Figure 14:
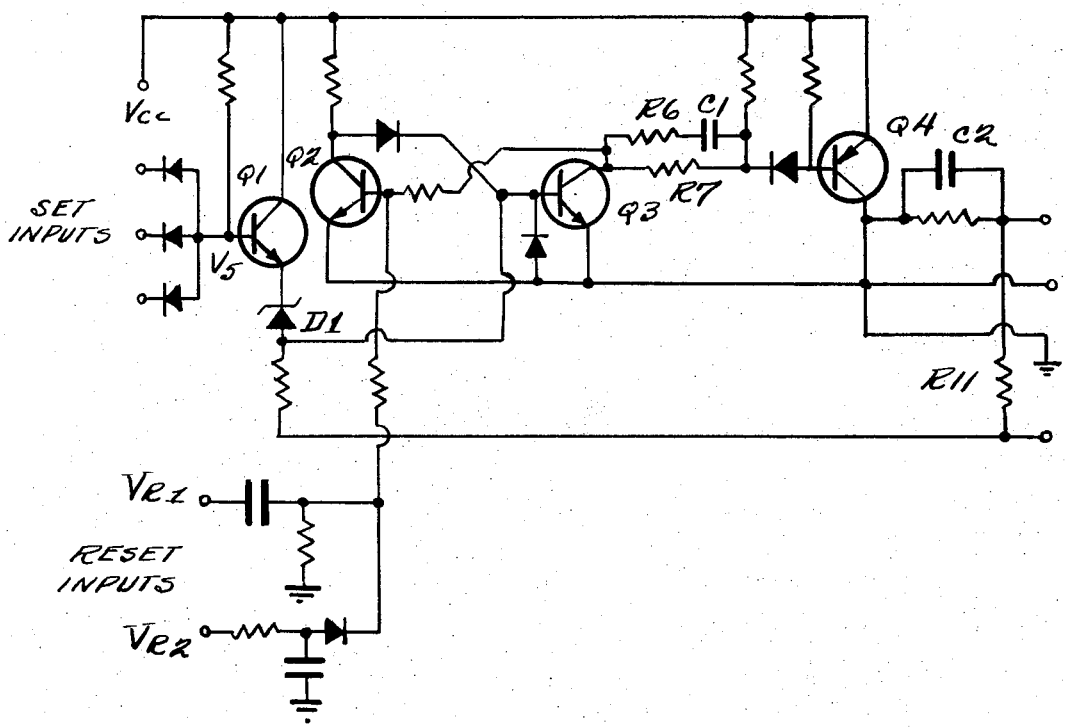
FIG. 14 shows a detailed schematic of the flip-flop drive circuit illustrated as a block in FIG. 12.

A reset-set (R-S) flip-flop is incorporated into the two main SCR drivers as shown in FIG. 14. The flip-flop is connected so that it is set by action of a trigger pulse from multivibrator 36 and reset by either the gate pulse applied by the commutation circuit or by a "last-ditch" pulse as described above. The purpose of the last-ditch pulse is to guarantee that the flip-flop will be turned off prior to the commutation of that pulse for the other main SCR circuits.

In the circuit of FIG. 14, transistor $Q_1$ is connected as an emitter follower. When voltage $V_s$ reaches value which is equal to the zener breakdown voltage, transistor $Q_3$ is turned on, setting the flip-flop with transistor $Q_2$ non-conductive and transistor $Q_3$ conductive. In this state, transistor $Q_4$ is turned on by resistor $R_6$, capacitor $C_1$ and resistor $R_7$. Resistor $R_8$ and capacitor $C_1$ provide a strong initial base drive to transistor $Q_4$, ensuring minimum turn-on time. Capacitor $C_2$ ensures that the gate circuit will receive a high initial current while resistor $R_{10}$ is included to handle "back porch" rent. Resistor $R_{11}$ operates to carry the negative gate current. A positive signal at either $V_{R1}$ or $V_{R2}$ will cause transistor $Q_2$ to be driven into its conductive condition, thus placing the flip-flop in the reset state. An output load line of 12 volts and 2 amps was obtained with a rise time ( 10 percent to 90 percent of only 0.02 microseconds.

Figure 15:
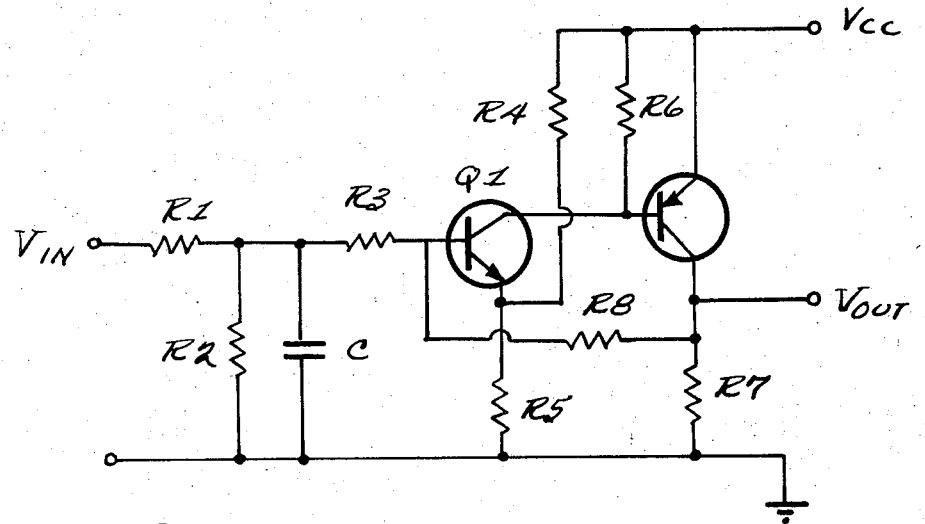
FIG. 15 shows a detailed schematic of the Schmidt delay circuit illustrated as a block in FIG. 12.

Reference is now made to FIG. 15 which illustrates a detailed schematic of the Schmidt delay circuits 20 and 22 in the block diagram of FIG. 12. As mentioned briefly above, the function of the first Schmidt relay circuit 20 is to eliminate problems associated with contact bounce in the switching circuits of the accelerator and brake pedals, for example, of an electrical vehicle. The second circuit 22, in connection with AND gates 24, 26, 28, 32 and 34, produces the desired SCR sequences during start up and shut down of the chopper as described above. The waveforms during start-up and shut-down are illustrated in FIG. 16. Mutually identical delay circuits 20 and 22 produce an output which is either "off" or saturated "on." Output switching is symmetrically delayed relative to the input so that when the input is energized, the output remains turned off for a time interval before going positive. Likewise, when the input is deenergized, the output is energized for a similar interval before switching to zero. An input hysteresis of 2 volts is achieved.

In the past, Schmidt trigger circuits have employed at least three transistors to produce an output voltage which switches between ground and the supply voltage. The unique Schmidt trigger circuit included in the Schmidt delay circuit illustrated in FIG. 15, as well as the circuit of FIG. 13, accomplishes this result with just two transistors — one NPN and one PNP transistor. Such a circuit finds use in many different applications, including in a control system for an electrical vehicle.

The operation of the Schmidt delay circuit is similar to that of the commutation drive circuits. An R-C delay is provided to the base of transistor $Q_1$ by resistors $R_1$ and $R_2$ and capacitor C. By properly choosing the bias point of transistor $Q_1$, almost any ratio between "on-going" and "off-going" delays can be produced and in the circuits actually builts, a nearly symmetrical delay of about 10 milliseconds was obtained.

Figure 17:
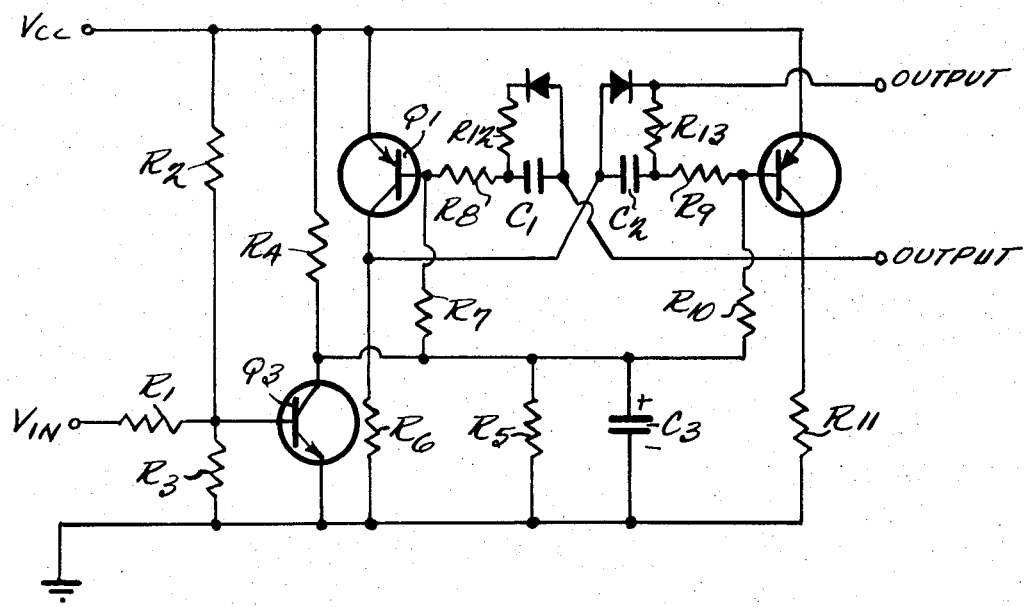
FIG. 17 shows a detailed schematic of the voltage controlled multivibrator circuit illustrated in block in FIG. 12.
Figure 18:
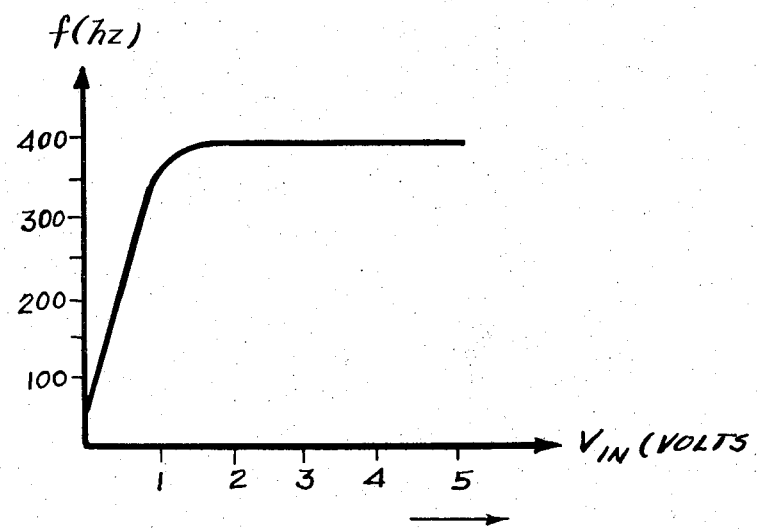
FIG. 18 shows the relation between output frequency and voltage input of the voltage controlled multivibrator circuit illustrated in FIG. 17.

Reference is now made to FIG. 17 which illustrates in detail a schematic of the voltage controlled multivibrator circuit and to FIG. 18 which depicts the relationship between the output frequency of the multivibrator circuit of FIG. 17 and the input voltage $V_{in}$. The function of the voltage control multivibrator is to produce a free running clock output and complementary outputs.

There are two control schemes which can be used in a chopper system to vary the energy which is delivered to the motor. In the first of these systems, often called "repetition rate modulation," the switch is turned on for a given invariable time for each cycle and the cycle time itself is varied. Thus, chopper frequency is high when the percentage of cycle time that the switch is conductive (duty cycle) is near unity and low when the duty cycle is small. This is generally desirable in an electrical vehicle where the cycle time is typically small when power levels are small and large when maximum power levels are desired. Since switching and commutation losses are to an extent proportional to the frequency, it is desirable, in most instances, that the chopper frequency should be low when power levels are small, and vice versa.

The main drawbacks to a "repetition rate modulation" arrangement are a poor output form factor at small duty cycles coupled with severe low frequency ac current components which are difficult to filter on the power source. These factors can present significant problems in vehicular applications where, at low speeds, small duty cycles at high and low currents may be required. This condition is particularly serious in that the SCRs must be rated to handle the rms currents, while commutating components must handle the higher peak currents. Furthermore, oversize commutation circuits, besides adding weight and cost, reduce operating efficiency. Worse still are the induced losses. The poor output form factor means that large ac voltage and current components are fed to the motor which, in turn, cause excessive eddy and hysteresis losses. In many cases, these losses are so bad that traction motors must be de-rated when used with such controllers.

Repetition rate modulation systems may further cause large battery induced losses. Such losses are high when currents are large and duty cycles small. The poor form factor, coupled with low frequency where battery capacitance or external filtering is ineffective, results in higher than absolutely necessary battery losses.

The second scheme which has been used is termed "pulse width ratio modulation." In this arrangement, the cycle remains constant and only the percentage of the cycle that the switch is conductive is varied. When condition time is small and load currents are high, the resulting input and output form factors are good since the chopper period is not lengthened. Furthermore, keeping a chopper frequency fixed permits maximum effective input filterings. The unwanted result, however, is that under zero duty cycle conditions, the pwoer level delivered to the load is non-zero and proportionate to the cycle frequency. In order to retain the advantages of the pulse width ratio scheme and also enable adequate power control under low duty cycle conditions, a hybrid control scheme is preferably employed.

At the expense of circuit complexity, a hybrid control scheme can be employed which varies both the period of the cycle and the time that the switch remains conductive within the cycle by, in effect, operating in the repetition rate modulation mode while the percentage of on-time is small and switching to the pulse ratio modulation mode when the percentage of time that the switch is on increases. This hybrid scheme combines the advantage of both systems, while avoiding most of the disadvantages of each since most of the control takes place in the duty cycle. The system enjoys the near unity form factor associated with the straight duty cycle scheme. This is carried out according to the embodiment illustrated in FIG. 17 by controlling the output of the multivibrator circuit so that the frequency of the pulses increases up to a certain level, for example, around 400 hertz, with increasing input voltage, that input voltage being associated with a demand for increased conduction of the switches during the cycle. After a certain input level, the frequency then remains invariant.

Since the multivibrator output pulses supply current when the output is positive, PNP transistors are used in the voltage controlled multivibrator circuit of FIG. 17. Capacitors $C_1$ and $C_2$ have added series resistors $R_8$ and $R_9$ to reduce the possibility of false triggering due to noise in the load circuit of the adjacent transistor. Transistor $Q_3$ is biased so that when $V_{in}$ is zero, collector current is just starting to flow. Resistor $R_4$ holds the collector of transistor $Q_3$ at a potential near $V_{cc}$. Accordingly, capacitors $C_1$ and $C_2$ charge relatively slowly and the frequency is low. As $V_{in}$ is made more positive, the collector of transistor $Q_3$ drops and the frequency increases. When $V_{in}$ gets to about 1 volt in the embodiment shown in FIG. 17, transistor $Q_3$ is saturated and the frequency thereafter remains constant.

Figure 19:
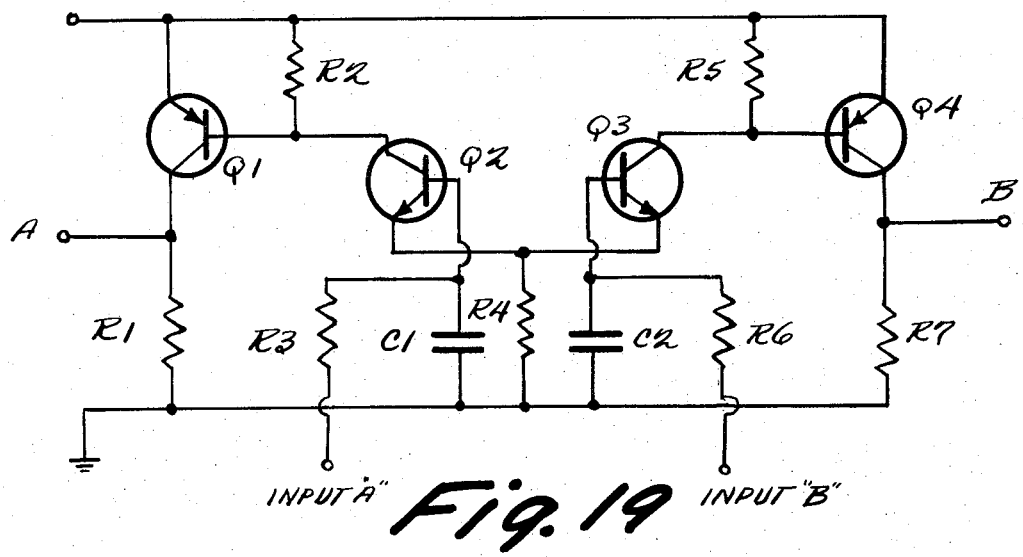
FIG. 19 shows a detailed schematic of the symmetric delay circuit illustrated in block in FIG. 12.
Figure 20:
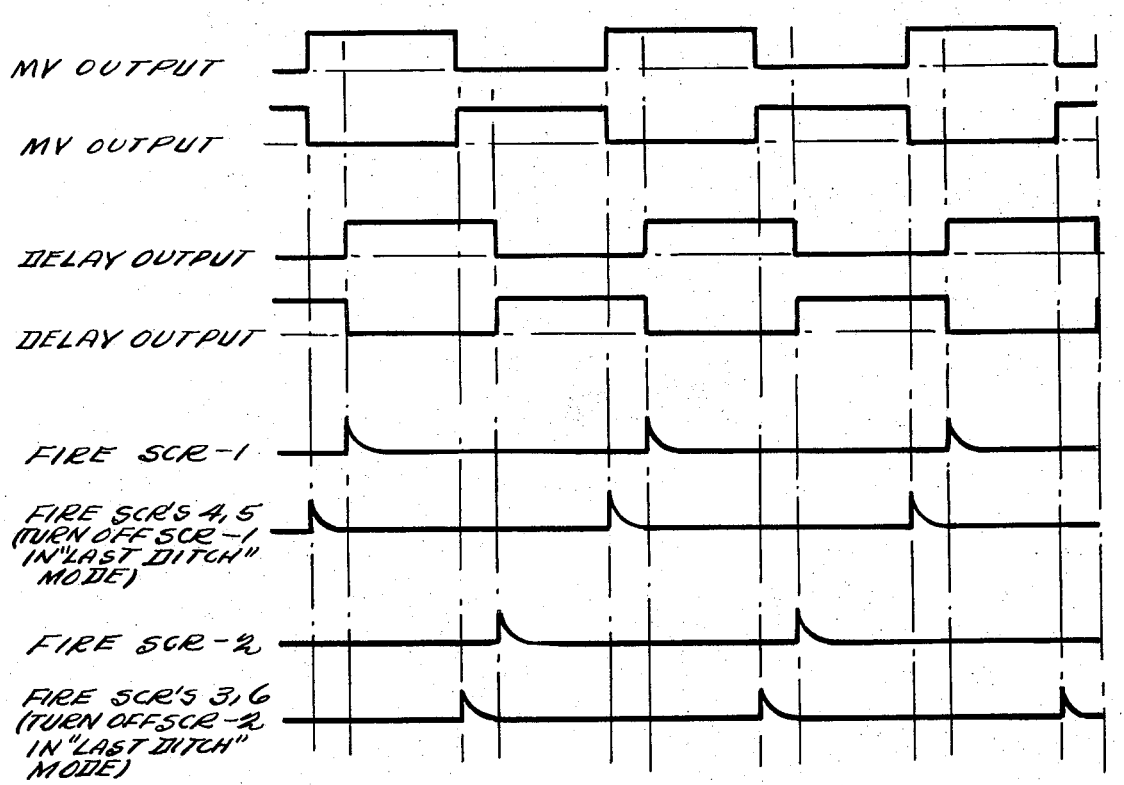
FIG. 20 shows the multivibrator and delay circuit firing pulses.

Reference is now made to FIG. 19 which illustrates a detailed schematic of a symmetric delay circuit 42 as indicated above. Commutation must be ended for each of the main SCRs — $SCR_1$ and $SCR_2$ not later than a certain interval before the next cycle. The symmetric delay circuit 19, as connected in FIG. 12, effectively produces such a delay. Transistors $Q_2$ and $Q_3$ are connected to form a differential amplifier. When the base of transistor $Q_2$ is more positive than the base of transistor $Q_3$, transistor $Q_2$ conducts and vice versa. When transsitor $Q_2$ is conductive, transistor $Q_1$ is forced into saturation and the output A goes positive. Likewise, when transistor $Q_3$ conducts, transistor $Q_4$ is saturated and the output B goes positive. Networks $R_3 - C_1$ and $R_6 - C_2$ are responsible for the delay. Since the circuit is symmetric, so is its function, and outputs A and B have equal delays relative to their respective inputs. Furthermore, to the first order of approximation, symmetry is not affected by a time constant inequality.

Operational amplifiers 50 and 52 are used to provide turn-off information. Fairchild 909 operational amplifiers were employed and, with such devices, the instantaneous value of the shunt voltage is compared with a fraction of the drive voltage. So long as the shunt voltage is less than the drive voltage, an operational amplifier remains in negative saturation. When the shunt signal becomes slightly larger than the drive voltage, the operational amplifier swings into positive saturation.

Commutation may be initiated by either the clock multivibrator 36 (last ditch turn off) or by a signal from the operational amplifier 50 or 52. It is necessary to prevent a double firing — once from the comparator output and once from the clock output. To accomplish this, two standard R-S flip-flops 60 and 62 are employed. When the comparator puts out a signal, the flip-flop outout goes positive which, in turn, triggers the corresponding Schmidt drive circuit 64 or 66 into the "on" mode. A second pulse from multivibrator 36, appearing at inputs $M_1$ or $M_2$ will have no effect since the Schmidt drive circuit is already on. With the start of the next cycle, signals $F_1$ and $F_2$ from delay circuit 42 reset flip-flop 60 or 62 respectively, thus preparing for a repeat of the above operations.

Standard RC decoupling circuits were used to prevent interaction between the blocks. In addition, these circuits supply the high spike currents drawn during the SCR firings. The only circuits sensitive to supply noise are the clock multivibrator and the operational amplifiers. Accordingly, decoupling circuits were connected to optimize filtering for these circuits.

Figure 21:
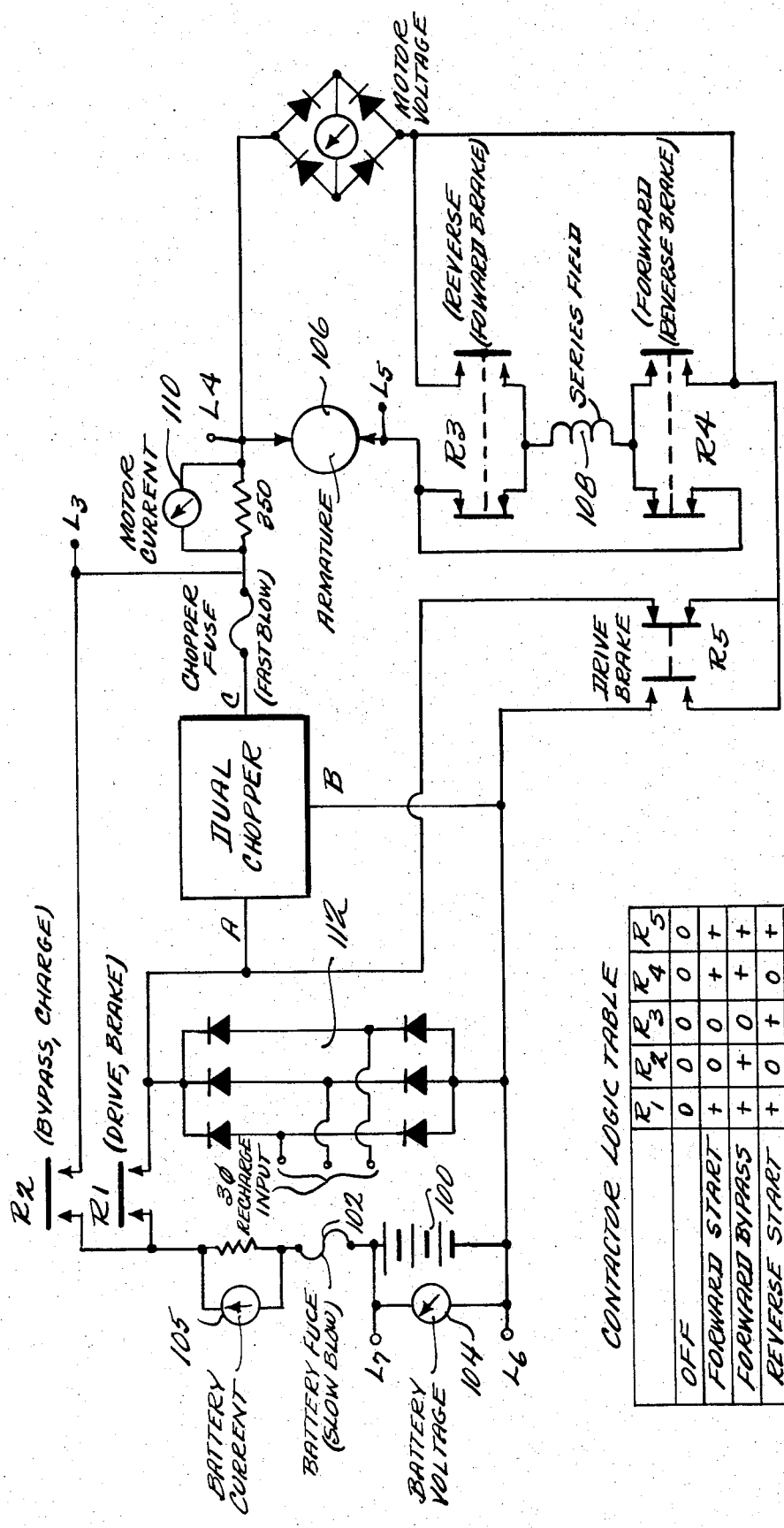
FIG. 21 shows a block diagram of a dual chopper circuit connected in an electrical vehicle for controlling the transfer of electrical energy from the batteries to the motor during normal operation, the transfer of electrical energy from the motor to the batteries during regenerative braking, and the transfer of electrical energy from an external source to the batteries during recharging.

Reference is now made to FIG. 21 which illustrates the use of a dual chopper, such as described above, in the control system of an electrical vehicle. This system has been termed a "3 in 1 system" since the same dual chopper operates to control the flow of electrical energy from the batteries to the motor while the vehicle is in normal operation, the flow of electrical energy from the motor to the batteries while the vehicle is being regeneratively braked, and the flow of electrical energy from an exterior voltage source to the batteries during recharging. In fact, it has been found that a higher power factor results from the use of a dual chopper during recharging than a single chopper. The three connections, A, B and C, to the dual chopper correspond to those same labeled connections in the embodiment illustrated in FIG. 9 and 11.

The main energy for driving the vehicle is stored in a one or more conventional electrical batteries 100 which may provide any suitable voltage, for example, 120 volts. A battery fuse 102 is serially connected to the battery, and a voltage meter 104 is also connected to the battery for providing an output indicating the voltage produced by batteries 100. An ammeter 105 is likewise serially connected with the battery for indicating the current which is being drawn from the battery. A conventional electrical motor with an armature 106 and a series field winding 108 drives the vehicle along the ground. An ammeter 110 provides an output indicating the current which is being drawn through the armature. A plurality of diodes indicated as 112 are adapted to receive and rectify three-phase ac recharge input.

Switches $R_1$, $R_2$, $R_3$, $R_4$ and $R_5$ connect these various elements to the three inputs A, B and C of the unique dual chopper of this invention illustrated in detail in FIGS. 9 and 11. Switches $R_5$ and $R_4$ each consist of two ganged switches as shown. Each of these switches are shown in their "off" position, the position which they assume while the vehicle is inoperative. The logic table provided with FIG. 21 indicates the position which these various switches assume during the seven modes of operation which are possible with the "3 in 1 system" of this invention. It is appreciated, of course, that further modes can be added if desired and that not all of the modes set forth in the table of FIG. 21 need not be used. It will be further understood that, while the circuit is connected as a "D-Chopper," it could alternatively be connected as an X-Chopper or L-Chopper as described above.

In the forward start mode, switch $R_1$ is closed, connecting the batteries 100 to input A of the dual chopper. Likewise, switches $R_4$ and $R_5$ are activated so that a current path through series winding 108 and armature 106 is completed between the terminal B of the dual chopper and one side of battery 100 via switch $R_5$, switch $R_4$ and switch $R_3$. The dual chopper then operates to control the current which is delivered to the motor windings as a function of accelerator pedal position or other control.

Should the motor require delivery of full battery voltage bypass, switch $R_2$ is closed in a forward bypass mode, shorting the dual chopper and directly connecting armature 106 and field winding 108 to battery 100.

In the reverse start mode, switches $R_1$, $R_3$ and $R_5$ are operated so that polarity of the voltage applied across field windings 108 is reversed to cause the motor associated with windings 108 to turn in the reverse direction and cause the car likewise to move in the reverse direction. There is also a reverse bypass mode in which switch $R_2$ is closed, shorting out the dual chopper.

In the forward regenerative brake mode, switches $R_1$ and $R_3$ are closed, completing a current path through armature 106 via switches $R_3$ and $R_1$ so that the pulses which are induced in the windings, braking the vehicle, are applied via the chopper circuit to batteries 102 to recharge the same and minimize energy losses within the system. Similarly, in the reverse regenerative mode, switches $R_1$ and $R_4$ are closed to reverse the direction of current through series winding 108.

Figure 24:
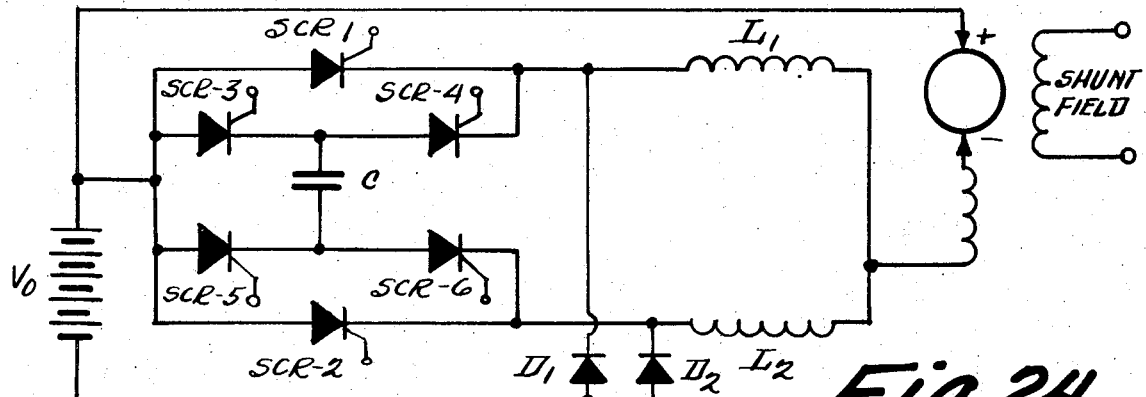
FIG. 24 shows the dual chopper circuit connected in the regenerative brake mode.
Figure 25:
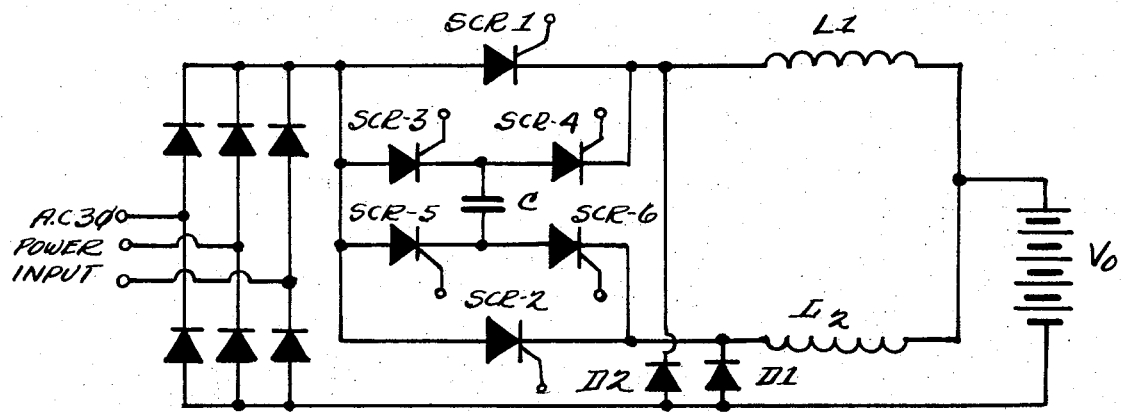
FIG. 25 shows the dual chopper circuit connected in the recharging mode.

Finally, for recharging, switch $R_2$ is closed while the remainder of the switches remain in their illustrated positions. Thus, batteries 100 are connected as the output load between terminals B and C of the dual chopper while the D.C. output of diode array 112 is connected between dual chopper terminals A and B. FIGS. 24 and 25 show the dual chopper connected in the regenerative brake and recharge modes, respectively.

Reference is now made to FIGS. 22 and 23 which illustrate the recharge logic and the driving and brake logic, respectively, for controlling the switches $R_1$, $R_2$, $R_3$, $R_4$ and $R_5$. To insure long contact life and to prevent ozone production, the relay switches should be energized and de-energized, if possible, under no load conditions. To this end, that the chopper be enabled by auxiliary signal contacts on switches $R_1$, $R_2$, $R_3$, $R_4$ and $R_5$ which close after the main contact is made and opened before the main contact is opened to insure that the current is cut off at the chopper and not at the switch contacts.

There are a number of constraints which are applicable to the three modes of operation. It should not be possible to drive the car while it is connected to the recharge outlet. The regenerative brake should override the accelerator pedal. It should not be possible to reverse the motors while driving forward. The bypass switch $R_2$ should close automatically when the chopper duty cycle reaches maximum. The bypass switch $R_2$ should automatically open, however, when motor current becomes significantly larger than that commanded by the accelerator pedal. In the event of a "lock up," all of the switches should be released. When switching from drive to brake modes or vice versa, all switches should be de-energized before being re-energized for a new configuration. It is likewise desirable that recharge turn on and turn off should be via a latching relay so that the power plug cannot be inserted under load.

During recharge, the chopper should be commanded to develop current output proportionate to a given setting and that current should be maintained until either battery voltage reaches a given threshold or a limit command is generated by one or more gas pressure sensors. The charging mode should be shut off when the battery voltage is at a given threshold and current has fallen below its respective threshold. Charging should not begin except by manually pressing a control button. If field control is to be used, field current during acceleration should be proportional to accelerator setting during unbypassed driving. After bypass switch $R_2$ is energized, the chopper should be disabled. Bypass switch $R_2$ should open before the chopper is re-enabled so that the normal turn off computation sequence is possible. After switch $R_2$ is energized, field current should be feed-back controlled so that the armature current remains proportional to the accelerator setting. The circuitry illustrated in FIGS. 22 and 23 carries out the essentials of the above functions.

The circuitry depicted in FIG. 22 relates primarily to the recharge function of the "3 in 1" scheme previously discussed. Voltage source 153 supplies d-c power for the five relay switches and various of the electronic elements in FIGS. 22 and 23. Sources such as shown in FIGS. 29 and 30 can be employed for this purpose.

Figure 29:
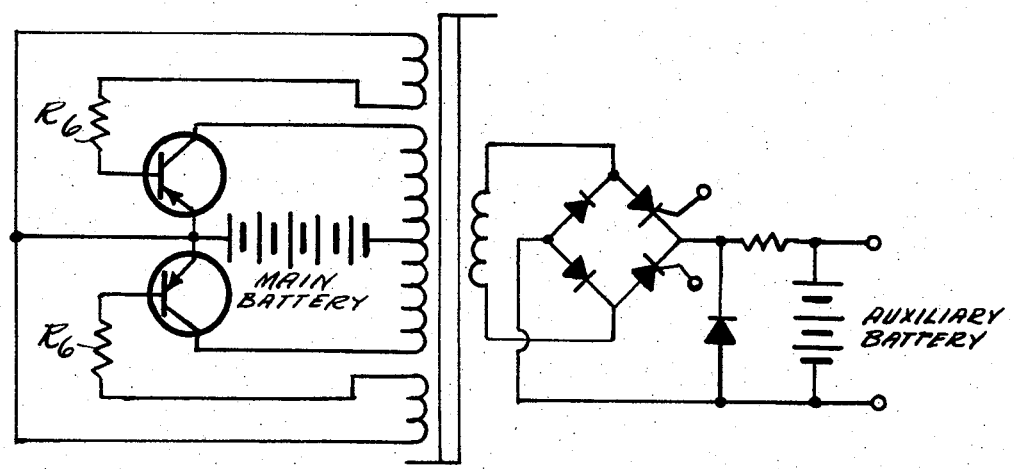
FIG. 29 shows a transistor multivibrator inverter with an SCR regulator.
Figure 30:
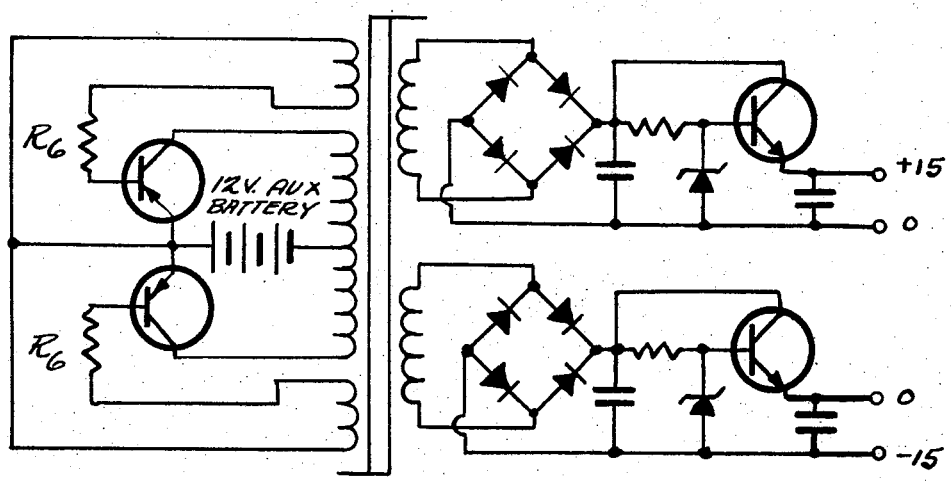
FIG. 30 shows a direct current to direct current converter circuit for supplying power to the electronic components of the control system.

Similarly, source 154 supplies a reverse bias voltage to operational amplifier 229 via resistor 323, and can be constructed in the same fashion as the circuits in FIGS. 29 and 30.

Ganged switches 150a and 150b prevent the vehicle from being driven during recharging. Switches 150a and 150b are preferably connected to a cover lid which is associated with the compartment in which the recharge connect cable is stored. In order for switch 150 to be in the normal position, so shown in FIG. 22, the recharge cable must be entirely within the above mentioned compartment, thus permitting the cover lid to close. During recharge, when the cover lid is opened, voltage from terminal $L_{10}$ of the voltage source is applied to line 151 via switch 150b. Switch 150a, also associated with the cover plate, effectively disconnects relay switches $R_1$, $R_3$, $R_4$ and $R_5$ during recharge thus preventing inadvertent vehicle operation.

Assuming switches 150a and 150b are in the downward or charging positon, relay coil 202, the corresponding relay contact switch 220a, push switches 226 and 210, and Schmidt trigger 224 constitute a "latching-delatching" combination which serve to:

1. Initiate charging when push switch 210 is depressed,
2. Terminate charging when push switch 226 is depressed,
3. Automatically terminate charging when the voltage at terminal 326, the input terminal of the Schmidt trigger, falls below a certain threshold as a result of either battery voltage reaching a set limit, or the sensed rate of battery gas evolution having reached a particular limit. Details are as follows. Under the conditions where neither the battery voltage nor the gas evolution rate are above predetermined threshold limits, the voltage at terminal 326 will be sufficiently high to drive the Schmidt trigger into the on state and output terminal 328 will be energized. When push switch 210 is depressed, voltage from line 151 is applied to relay coil 202 thus causing both contact switches 220a and 220b to shift to the downward position. Accordingly, contact switch 220a connects relay coil 202 with the Schmidt trigger output thus resulting in a latching action. Switch 226 is connected in series with line 151 and supply voltage terminal 327 of the Schmidt trigger. Accordingly, when switch 226 is depressed, Schmidt trigger 224 is de-energized which in turn causes relay coil 202 to de-energize so that "de-latching" occurs.

Diode 225 connects the coil of relay switch $R_2$ in parallel with relay coil 202. Accordingly, when coil 202 is energized, as described above, relay switch $R_2$ is activated thus connecting the circuit of FIG. 21 in the recharge mode.

Diode 256 connects the coil of relay coil 202 to the "enable input" of the dual chopper shown in detail in FIGS. 9 and 12. Accordingly, when coil 202 is energized, the dual chopper is gated on. Diodes 255 and 256 prevent the relay coil 202 from being energized when signals are applied to either of points $L_{22}$ or F during the driving and braking modes of operation. When relay 202 is energized, switch contacts 220b are in the downward position, thus connecting the chopper driven input, point C, to line 232. Accordingly, the chopper will regulate recharge current in proportion to the voltage developed across resistor 325.

As described below, the voltage across resistor 325 is regulated by operational amplifier 227 and transistor 230, which together with the dual chopper for main effective feedback, in such a way, that the resulting charge current causes neither excessive gas evolution from the battery, nor excessive charge voltage applied to the battery.

Element 250 is a gas-flow sensing element which develops an output voltage which is proportional to the rate of gas flow. One sensor which can be used includes a membrane which shifts its position as a function of gas pressure, interrupting an optical path to vary a control signal. For the specific embodiment shown in FIG. 2, the output voltage at terminal $L_{15}$ of sensor 250 must be negative with respect to common connection $L_3$.

Terminal $L_6$ connects to the negative side of the battery. Resistors 320 and 321 divide the total battery voltage to an appropriate level. Diodes 252 and 254 form an "OR" gate which couples the gas sensor output and the attenuated battery voltage to the non-inverting input of operational amplifier 227. Risistor 323 applies a negative bias to the inverting input of the amplifier such that it is normally held in saturation with the output positive. Potentiometer 228 divides the output voltage of the amplifier and serves to provide the maximum current flow. Transistor 230 is connected as an emitter follower and supplies voltage to line 232.

From the above, it is apparent that the voltage on line 232, and hence the recharge rate, is regulated such that neither the rate of gas evolution or the battery voltage will exceed thresholds which are determined by the values of resistors 320, 321, 322, 323, 324 and 329, and these thresholds can be manually varied as desired.

The following explanations apply to the circuitry of FIG. 23 which is used to activate relay switches and the dual chopper in the drive and brakes modes. Many other similar control circuits can be used. The position ganged switch 158 controls vehicle direction. In the upward position, the vehicle may be driven and regnerative braked in the forward direction. In the lower position, reverse motions may be controlled. Ganged switch 208 is mechanically connected with the brake pedal. When the pedal is depressed, switch 208 is reconfigured to the downward position. Ganged switch 164 which is mechanically connected with the accelerator pedal, is shown in the full-up position of the accelerator pedal. Switch 180 is effectively ganged with relay switch $R_5$, and switch 190 is similarly ganged with relay switch $R_2$.

Elements 210 and 211 are variable voltage sources which are acted upon by the brake and accelerator pedals respectively. In practice, potentiometers, or any type of optical or magnetic sensors may be used for elements 210 and 211.

Terminal D connects to the corresponding terminal on FIG. 22. Accordingly, when the system is not in the recharge mode, control element 210 is effectively connected to the drive input of the dual chopper whenever the brake pedal is depressed. Furthermore, the chopper drive input is connected to control element 211 whenever the accelerator pedal is depressed, assuming the brake pedal is not depressed. Accordingly elements 210 and 211 serve to control the magnitude of acceleration and deceleration torques respectively. It is furthermore noted that the control function associated with the brake pedal dominates the control function associated with the accelerator pedal.

Elements 191, 214, 216, 218 and associated components energize relay switch $R_2$ such that bypass is automatically effected when the chopper duty cycle has reached a near maximum value. Furthermore, these same components de-energize $R_2$ when the motor current, as sensed by the voltage present at point $L_4$, is significantly greater than that commanded by the accelerator pedal.

Details of operation are as follows. Relay switch $R_5$ which connects to terminal $L_{25}$ can reveive voltage supply only when switch 164a is depressed. Accordingly, switch $R_5$ remains in the brake position, as shown in FIG. 21, whenever the accelerator pedal is not depressed. Furthermore, since power is supplied to switch 1642 via the normal position contact of switch 162a, $R_5$ cannot be energized whenever the brake pedal is depressed. Since the de-energized position of $R_5$ is the brake position, the brake pedal dominates the accelerator pedal with respect to mode switching. Diode 311 prevents $R_5$ from being energized when $R_1$ is energized.

The purpose of switch 180 is to disable (turn off) the dual chopper during the instants when $R_5$ is switching from brake to drive and vice versa. Accordingly, arcing at the relay switches is eliminated. Diode 312 prevents voltage being applied to either relay switch $R_4$ or $R_5$ during the recharge mode.

Switches 158b and 158c, in conjunction with switch 180, cause relay switch $R_4$ to be energized while in the forward drive or reverse brake modes. Similarly, $R_3$ is energized while in the reverse drive or forward brake modes.

Relay switch $R_2$ is energized, thus effecting bypass, when all three inputs of AND gate 214 are energized. The upper gate is energized when and only when $R_5$ is energized. Accordingly, bypass cannot be effected unless the system is in the drive mode. By action of inverting gate 216, the lower gate will be energized when and only when the voltage appearing between terminals A and C of the dual chopper is sufficiently small. Accordingly, the lower gate of 216 is energized when and only when a near unity duty cycle has been achieved. Under normal operating conditions, the output of operational amplifier is energized, thus allowing the upper and lower imputs to gate 214 to determine the output state of gate 214.

The non-inverting input of operational amplifier 191 connects to the swinger of potentiometer 303 as shown. Accordingly, a voltage proportionate to the accelerator depression, is applied to the non-inverting input of amplifier 191.

Figure 26:
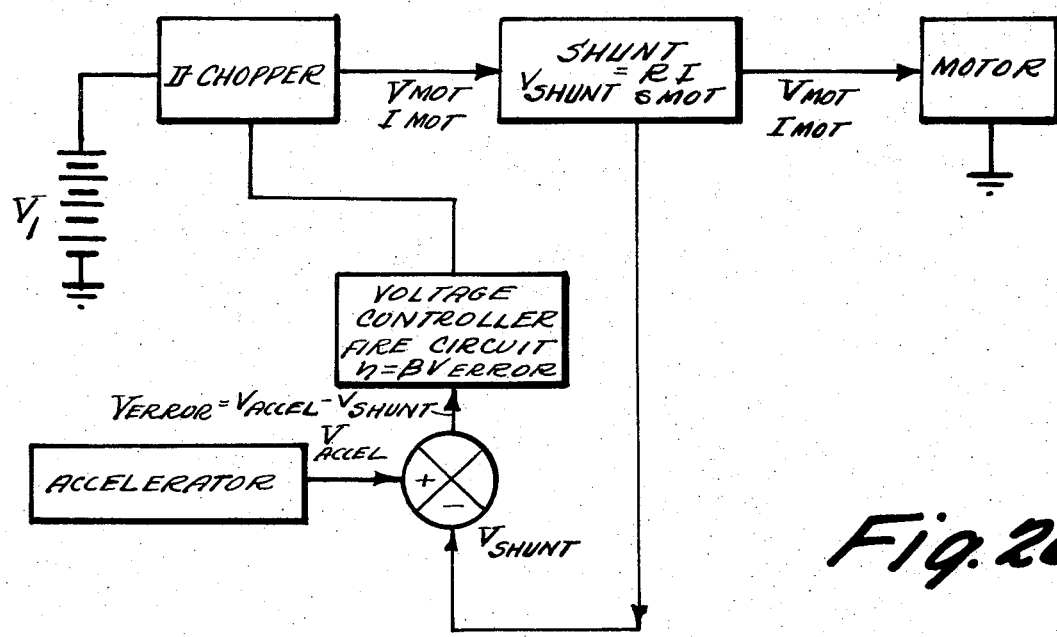
FIG. 26 shows a block diagram of a voltage controlled duty cycle feedback system for producing a signal for controlling the chopper circuit.

The voltage at point $L_4$ is proportionate to the motor current, by action of the resistance in shunt 350. This voltage is applied to the inverting input of amplifier 191 via resistor 301. Through proper choice of resistances 310 and 302, and by properly setting potentiometer 303. the output of amplifier 191 will remain in positive saturation until the motor current becomes larger, by a determined amount, than a valve proportional to the accelerator setting. At this time, amplifier 191 will desaturate and thereby de-energize gate 214, thus causing bypass relay switch $R_2$ to de-energize. The circuitry used to operate $R_2$ inherently possesses hysteresis thus preventing instabilities. Resistor 304 and capacitor 305 form a low-pass filter which eliminates a-c signal components from the $L_7$ circuit which result from the chopping action of the dual chopper. FIG. 26 illustrates a block representation of the way in which this is carried out. In this block diagram $V_1$ is the battery voltage which is assumed constant. The control element is, of course, the chopper. The actual motor current as sensed by the shunt is compared with a signal derived from accelerator pedal position to generate an error signal, which in turn controls the chopper firing circuit (point C in FIGS. 22 and 23).

Another technique which can be employed bypasses the electronic generation of a duty cycle altogether. Instead, the chopper is turned on and off as a function of currents flowing within the chopper itself.

Several auxiliary sources of power are usually required by an electrical vehicle. In particular, with the current described above, an isolated, regulated, noise free source of plus 12 and minus 12 volts, is required for the chopper circuit. This calls for a source that is preferably operational over the entire voltage range of the main battery. In the case of a 120-volt battery, this range is 80–150 volts. A current limited voltage regulated power supply is also needed to maintain the charge level of a 12-volt ballast battery which supplies auxiliary lighting and relay power when the main electronics is shut down. While separate supplies could be built for each of these requirements, it is far more desirable to integrate these supplies providing weight, size and cost reductions.

One possible technique is to use a conventional automotive alternator and regulator system, driven from the traction motor. This is one of the simplest and least expensive means providing regulated power to the 12-volt auxiliary battery. The regulated power for the firing circuit is thus obtained from a small and economical solid state converter, many types of which are conventionally available. The primary drawback with this type of arrangement is that no recharge power is supplied the auxiliary battery when the vehicle is stationary. Thus, during recharge of the main battery bank, when power is being drawn from the auxiliary battery for relays, the firing circuit and possibly for the headlights, it is possible that the auxiliary battery will become discharged which in turn would cause failure of the entire system. At the expense of added complication, a line operated charger could be added to take over while the main battery is being charged.

Another technique is to use a motor driven alternator for charging the auxilary battery. This is the same as described above except that the alternator is now driven by constant speed shunt wound D.C. motor. It is possible to provide auxiliary recharge current whether or not the vehicle is in motion. Besides providing more efficient operation of the alternator, this arrangement has another important advantage. By connecting directly to the alternator winding, ac power is obtained which may then be transformed and rectified to supply D.C. requirements for firing circuits and relays. The system does have two drawbacks namely, mechanical maintenace and acoustical noise.

A third possibility is using one of several types of SCR inverters to invert the main battery to high frequency ac for driving a toroid transformer. Isolated secondary windings from the transformer are then connected to rectifier and regulator circuits which in turn supply the auxilary battery and the firing circuit with the desired d.c. power. Converters of this variety are unfortunately expensive, low in efficiency and are vulnerable to input and output voltage transients.

Reference is now made to FIGS. 29 and 30 which show transistor converters which are fairly reliable and rugged. Low cost transistors now are available having collector voltage ratings in excess of 200 volts rendering it feasible and economical to construct a transistor version of the previously mentioned SCR converter. Using such transistors, it is possible to construct a voltage regulator which regulates the battery voltages prior to inversion, thus eliminating the several regulators conventionally required for each of the secondary circuits.

It is possible to use various forms of the D-chopper for d.c. to d.c. conversion where isolation is not required. In the case where one battery is being charged from a battery of higher potential, conventional choppers require a current sensing feed back loop to insure current limiting. Using the basic circuit of FIGS. 9 and 11, an extremely simple charger was developed which can be safely run without the need for current sensing. Such a chopper is illustrated in FIG. 27 together with representative values for the inductances.

Figure 27:
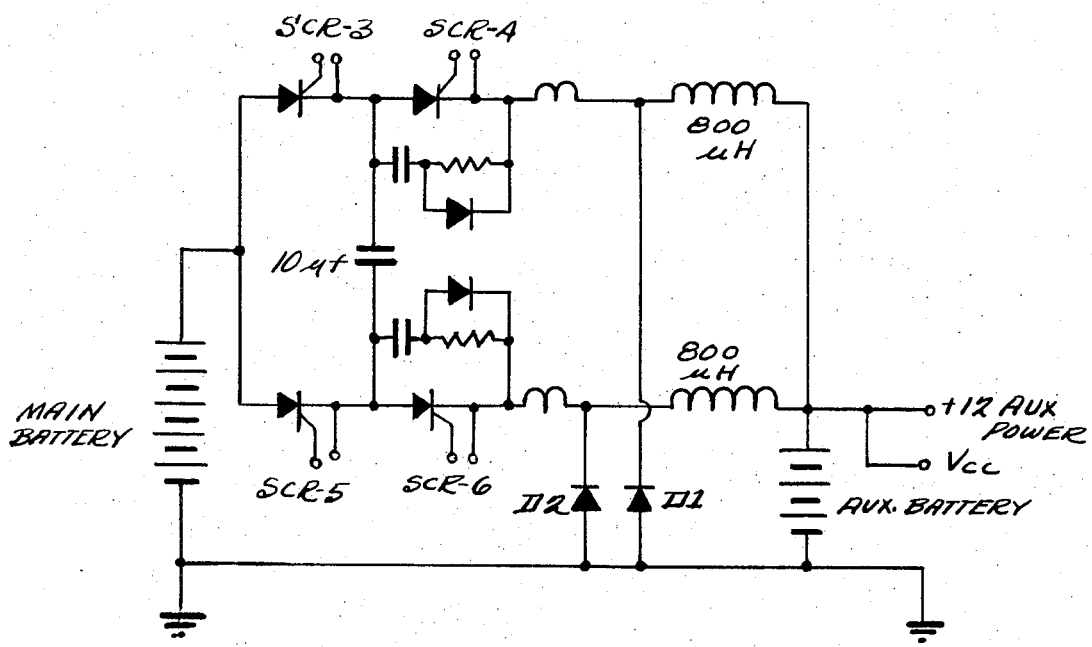
FIG. 27 shows the power section of an auxiliary battery chopper charger.
Figure 28:
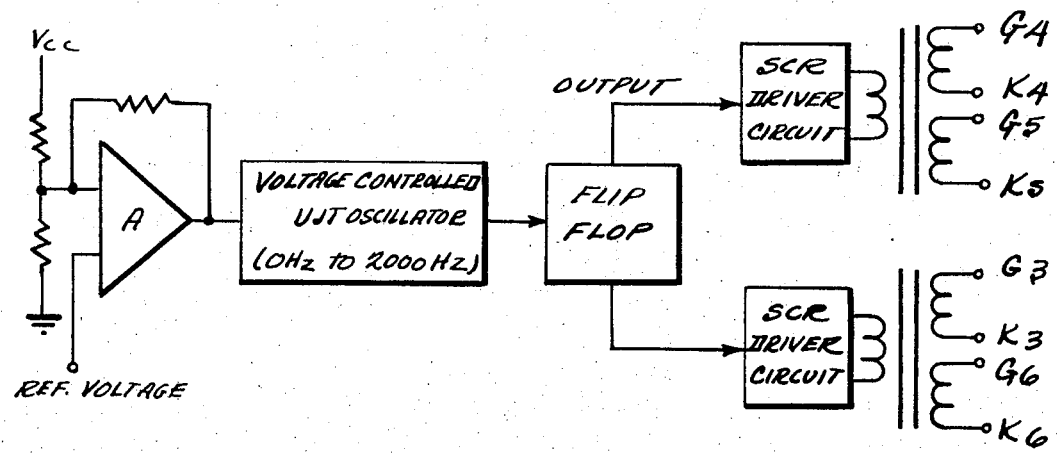
FIG. 28 shows the firing circuit for the chopper charger of FIG. 27.

The FIG. 27 circuit has the unique feature of power control, in the true sense, in that the product of output voltage and current is a constant, which is not dependent on the load impedance, but which is directly proportionate to the firing frequency of the SCRs. Further discussion of the FIG. 27 circuit is brought forth on pages 50 and 92 of the above mentioned thesis.

For firing the circuit in FIG. 27, a voltage control oscillator was used which generates frequencies between zero and a fixed limit of 2,000 Hz for control voltages ranging between zero and about 5 volts. This oscillator then drives a goggled flip-flop, the output of which fires $SCR_4$ and $SCR_5$ while the complement output fires $SCR_3$ and $SCR_6$ in FIG. 27. By connecting the oscillator control input to the output of another circuit with a reference voltage, regulation is effected. Power levels and current levels are restricted as the result of the upper limit on the firing frequency. The system was constructed and proved to be economical, insensitive to transient load conditions and capable of providing excellent voltage regulation.

As described above, the specific circuit shown in FIGS. 9 and 11 has been found to be particularly satisfactory, operating to transfer energy from a source to a load. This circuit and similar circuits have been found to be particularly advantageous in control circuits for electric vehicles in which essentially the same circuit is used to control at least three different types of transfer of electrical energy with a system —transfer of energy from the batteries to the motor during normal operation, transfer of energy from the motor to the batteries during regenerative braking, and transfer of energy from an external source to the battery during recharging.

Many changes and modifications in the above described embodiments of the invention can, of course, be made without departing from the scope of the invention. Accordingly, that scope is intended to be limited only by the scope of the appended claims.

I claim:

1. An electrical power control system for an electrically powered vehicle having a motor for driving the vehicle along the earth's surface, manual control means for varying the speed of the vehicle, electrical energy storage means having terminals for producing a direct current output voltage and for receiving electrical energy to recharge said storage menas and means for receiving energy from an external voltage source comprising:

chopper circuit means for receiving at one terminal an input direct current voltage and producing at a second terminal a direct current voltage output including means for controlling the magnitude of said direct current output voltage, and switch means for connecting said chopper circuit in a first configuration between said terminals of electrical energy storage means and said motor for supplying electrical energy to said motor to drive said vehicle along the earth's surface, in a second configuration between said terminals of energy storage means and said motor for recharging said storage means during regenerative braking and in a third configuration between said terminals of energy storage means and said energy receiving means for recharging said storage means from an external voltage source.

2. A system as in claim 1 wherein said first configuration includes a first mode for causing said vehicle to move forward, a second mode to cause said vehicle to move backward, a third mode to cause said vehicle to move forward and in which said storage means is connected directly to said motor and a fourth mode to cause said vehicle to move backward and in which said storage means is connected directly to said motor and wherein said second configuration includes a first mode in which said vehicle is moving forward and a second mode in which said vehicle is moving backwards.

3. A system as in claim 2 wherein said storage means is a battery having first and second terminals and said motor includes a field winding and an armature winding and wherein said switch means includes a first switch connecting one terminal of said battery to said one terminal of said chopper circuit means, a second switch connecting said one terminal of said chopper circuit to said second terminal of said chopper circuit, a third switch having a first position connecting one end of said series winding to one side of said armature winding and a second position, a fourth switch having a first position connecting the other end of said series winding to said one end of said armature winding and a second position and a fifth switch having a first position connecting said one terminal of said chopper circuit to said other end of said series winding when said fourth switch is in said second position and to said one end of said series winding when said third switch is in said second position, and a second position connecting the other terminal of said battery to said other end of said series winding when said fourth switch is in said second position and to said one end of said series winding when said third switch is in said second position.

4. A system as in claim 1 wherein said chopper circuit includes:

first electronic switching means having first and second switch terminals and a gate terminal so that a current path is completed between said first and second terminals when a given voltage signal is applied to said gate terminal and is interrupted when a given back bias voltage is applied between said first and second terminals, second electronic switching means having first and second switch terminals and a gate terminal so that a current path is completed between said first and second terminals when a given voltage signal is applied to said gate terminal and is interrupted when a given back bias voltage is applied between said first and second terminals, third electronic switching means having first and second switch terminals and a gate terminal so that a current path is completed between said first and second terminals when a given voltage signal is applied to said gate terminal, means for connecting said first terminal of said first switching means to said first terminal of said third switching means, fourth electronic switching means having first and second switch terminals and a gate terminal so that a current path is completed between said first and second terminals when a given voltage signal is applied to said gate terminal, means for connecting said second terminal of said fourth switching means to said second terminal of said first switching means, fifth electronic switching means having first and second switch terminals and a gate terminal so that a current path is completed between said first and second terminals when a given voltage signal is applied to said gate terminals, means for connecting said first terminal of said second switching means to said first terminal of said fifth switching means, sixth electronic switching means having first and second switch terminals and a gate terminal so that a current path is completed between said first and second terminals when a given voltage signal is applied to said gate terminal, means for connecting said second terminal of said second switching means to said second terminal of said sixth switching means.

5. A system as in claim 4 wherein each of said switching means is a silicon controlled rectifier.

6. A system as in claim 4 further including:

means for connecting together said first terminals of said first, second, fifth and sixth switching means to define a first circuit terminal, a first inductor having first and second terminals, means for connecting said first terminal of said first inductor to said second terminals of said first and fourth switching means, a second inductor having first and second terminals, means for connecting said first terminal of said second inductor to said second terminals of said second and sixth switching means, means for connecting together said second terminals of said first and second inductors to define a second circuit terminal, a capacitor having a first and second terminals, means for connecting said first terminal of said capacitor to said first terminal of said fourth switching means and said second terminal of said third switching means, and means for connecting said second terminal of said capacitor to said first terminal of said sixth switching means and said second terminal of said fifth switching means a first diode having first and second terminals, means for connecting said first terminal of said first diode to said first terminal of said first inductor, a second diode having first and second terminals, means for connecting said first terminal of said second diode to said first terminal of said second inductor, and means for connecting said second terminals of said first and second diodes to define a third circuit terminal.

7. A circuit as in claim 6 wherein said means for connecting said first terminal of said second inductor to said second terminals of said second and sixth switching means includes a third inductor and wherein said means for connecting said first terminal of said first inductor to said second terminals of said first and fourth switching means includes a fourth inductor.

8. A circuit as in claim 7 wherein the values of said first and second inductors are approximately 1,000 microhenrys and the values of said third and fourth inductors are approximately 50 microhenrys.

9. A circuit as in claim 6 further including a snubbing circuit connected between the first and second terminals of said first, second, fourth and sixth switching means each snubbing circuit including a resistor having first and second terminals, a snubbing diode having a first terminal connected to said first terminal of said resistor, and a second terminal connected to said second terminal of said resistor, and a snubbing capacitor connected to said first terminals of said resistor and snubbing diode.

10. A circuit as in claim 6 further including a further capacitor connected between said first and third circuit terminals and a serially connected capacitor and resistor also connected between said first and third circuit terminals.

11. A circuit as in claim 6 further including a voltage source connected between said first and third circuit terminals and a load connected between said second and third circuit terminals.

12. A circuit as in claim 6 further including means for alternately applying a signal to the gate terminals of said first and second switching means to complete said current path so that said first and second switching means alternately conduct current for applying signals to the gate terminals of said fourth and fifth switching means following application of a signal to the gate terminal of said first switching means to back bias said first switching means and interrupt the current path through said first switching means and for applying signals to the gate terminals of said third and sixth switching means following application of a signal to the gate terminal of said second switching means to back bias said second switching means and interrupt the current path through said second switching means.

13. A circuit as in claim 6 further including:

a multivibrator producing at an output thereof, a signal alternately shifting between a first and second electical condition, a delay circuit connected to the output of said multivibrator for receiving signal and producing a further signal alternately shifting between first and second electrical condition delayed in time with respect to the received signal, logic means connected to said delay circuit for receiving further signal, and producing a first enable signal when said further signal shifts from said first to second condition and a second enable signal when said further signal shifts from said second to said first condition, means connected to said logic means for receiving said second enable signal and for causing said second electronic switch means to be rendered conductive when said second enable signal is received, first flip-flop means connected to said delay circuit for receiving said further signal and for shifting from a first to second output condition when said further signal shifts from said first to said second condition, second flip-flop means connected to said delay circuit for receiving said further signal and for shifting from a first to second output condition when said further signal shifts from said second to said first condition, means connected to said first flip-flop means for causing said first flip-flop means to shift from said second to said first output condition a given time following shift of said first flip-flop means from said first to said second condition, and means connected to said second flip-flop means for causing said second flip-flop means to shift from said second to said first output condition a given time following shift of said second flip-flop means from said first to said second condition.

14. A circuit as in claim 13 further including means connected to said first flip-flop means for causing said first electronic switching means to be rendered non-conductive when said first flip-flop means shifts from said second to said first output condition and means connected to said second flip-flop means for causing said second electronic switching means to be rendered non-conductive when said second flip-flop means shifts from said second to said first output condition.

15. A cirvuit as in claim 14 further including:
means for receiving an enable signal,
delay circuit means for receiving said enable signal and producing a delayed enable signal,
futher delay circuit means for receiving said delayed enable signal and produced a further delayed enable signal,
logic means connecting said further delay circuit means to said means for causing said first switching means to be rendered conductive and to said means for causing said second switching means to be rendered conductive for preventing said first and second switching means from being rendered conductive until said further delay circuit means produces said further delayed signal, and
logic means connecting said delay circuit means to said means for causing said first switching means to be rendered non-conductive and to said means for causing said second switching means to be rendered non-conductive for preventing said first and second switching means from being rendered non-conductive.

16. A circuit as in claim 13 further including logic means connected to said first flip-flop means and to the output of said multivibrator for receiving said signal at the output thereof and for causing said first flip-flop means to shift from said second to said first output condition when said signal received from said multivibrator shifts from said first to said second condition if said first flip-flop means has not previously been shifted from said first to second output condition and logic means connecting said second flip-flop means to the output of said multivibrator for receiving said signal at the output thereof and for causing said second flip-flop means to shift from said second to said first output condition when said signal received from said multivibrator shifts from said second to said first output condition if said second flip-flop means has not previously been shifted from said first to second output condition.

17. A circuit as in claim 13 wherein each said means shift from a second to first condition and includes means for comparing first and second electrical signals and producing a signal to cause said flip-flop connected to that causing means to shift from said second to said first output condition when the compared signals differ by a predetermined amount.

18. A circuit as in claim 17 wherein each said means for causing a flip-flop means to shift from a second to first condition includes an operational amplifier.

19. A system as in claim 1 further includes means for preventing said switch means from connecting said chopper circuit means in any configuration except said second configuration so long as said terminals of said storage means are connected to said external source.

20. A system as in claim 19 wherein said preventing means includes a switch having a first position when said terminals are connected to said source and a second position when said terminals are not connected to said source.

21. A system as in claim 20 wherein said switch means includes a plurality of relays each having at least a single controlled switch, logic means for controlling said relays to connect said chopper in said first, second and third configurations and a logic voltage source for supplying energy to said relays and logic means connected to said switch of said preventing means and wherein said preventing means further includes means for connecting at least some relays to said switch of said preventing means so that those relays are disconnected from said logic voltage source when said switch of said preventing means is in said first position.

22. Apparatus as in claim 1 further includes means for controlling the charging rate when said chopper circuit means is in said second configuration.

23. Apparatus as in claim 22 wherein said controlling means includes means for providing a signal which varies as a function of the gas pressure in said storage menas and means for controlling the rate of charging as a function of said signal.

24. Apparatus as in claim 23 wherein said controlling means further includes means for preventing further charging after said storage means is completely charged.

25. A system as in claim 1 further including means for producing a first signal which varies as a function of the position of said manual control means, means for producing a second signal which varies as a function of motor current, means for comparing said first and second signals and producing a further signal which varies as a function of the difference between said first and second signal, further switch means having a first position connecting said storage means directly to said motor and a second position not connecting said storage means to said motor and means for causing said further switch means to shift from said second to first position when said further signal reaches a given value.

26. A system as in claim 2 further including:
first switch means having a first output condition when said manual control means is being operated and a second output condition when said manual control means is not being operated, second switch means having a first output condition when a brake is being manually operated and a second output condition when that brake is not being manually operated, third switch means having a first output condition when said storage means is receiving electrical energy from an external source and a second output condition when said storage means is not receiving electrical energy from an external source, and logic means connected to said first, second and third switch means and to said switch means connecting said switch means in said configuration for controlling the configuration and mode in which said chopper circuit is connected.

27. A system as in claim 26 further including fourth switch means having a first output condition when said vehicle is moving forward and a second output condition when said vehicle is moving backwards.

28. A method of operating an electrical power control system for an electrically powered vehicle having a motor for driving the vehicle along the earth's surface, manual control means for varying the speed of the vehicle, electrical energy storage means having terminals for producing a direct current output voltage and for receiving electrical energy to recharge said storage means, means for receiving energy from an external voltage source, and chopper circuit means for receiving at one terminal an input direct current voltage and producing at a second terminal a direct current voltage output including means for controlling the magnitude of said direct current output voltage, comprising the steps of:

connecting said chopper circuit in a first configuration between said terminals of electrical energy storage means and said motor for supplying electrical energy to said motor to drive said vehicle along the earth's surface, connecting said chopper circuit in a second configuration between said teminals of energy storage means and said motor for recharging said storage means during regenerative braking, and connecting said chopper circuit in a third configuration between said terminals of energy storage means and said energy receiving means for recharging said storage means from an external voltage source.

29. An electrical power control system for an electrically powered vehicle having a motor for driving the vehicle along the earth's surface, manual control means for varying the speed of the vehicle, electrical energy storage means having terminals for producing a direct current output voltage and for receiving electrical energy to recharge said storage means and means for receiving energy from an external voltage source comprising:

chopper circuit means for receiving at one terminal an input direct current voltage and producing at a second terminal a direct current voltage output including means for controlling the magnitude of said direct current output voltage, switch means for connecting said chopper circuit between said terminals of electrical energy storage means and said motor for supplying electrical energy to said motor to drive said vehicle along the earth's surface, further switch means having a first position connecting said storage means directly to said motor and a second position not connecting said storage means to said motor, and logic means for causing said further switch means to shift from said second to first position when the speed called for by said manual control means exceeds the actual speed of said vehicle by a predetermined amount.

30. A system as in claim 29 wherein said chopper circuit includes:

first electronic switching means having first and second switch terminals and a gate terminal so that a current path is completed between said first and second terminals when a given voltage signal is applied to said gate terminal and is interruped when a given back bias voltage is applied between said first and second terminals, second electronic switching means having first and second switch terminals and a gate terminal so that a current path is completed between said first and second terminals when a given voltage signal is applied to said gate terminal and is interrupted when a given back bias voltage is applied between said first and second terminals, third electronic switching means having first and second switch terminals and a gate terminal so that a current path is completed between said first and second terminals when a given voltage signal is applied to said gate terminal, means for connecting said first terminal of said first switching means to said first terminal of said third switching means, fourth electronic switching means having first and second switch terminals and a gate terminal so that a current path is completed between said first and second terminals when a given voltage signal is applied to said gate terminal, means for connecting said second terminal of said fourth switching means to said second terminal of said first switching means, fifth electronic switching means having first and second switch terminals and a gate terminal so that a current path is completed between said first and second terminals when a given voltage signal is applied to said gate terminals, means for connecting said first terminal of said second switching means to said first terminal of said fifth switching means, sixth electronic switching means having first and second switch terminals and a gate terminal so that a current path is completed between said first and second terminals when a given voltage signal is applied to said gate terminal, and means for connecting said second terminal of said second switching means to said second terminal of said sixth switching means, 31. A system as in claim 30 further including:

means for connecting together said first terminals of said first, second, fifth and sixth switching means to define a first, second, fifth and sixth switching means to define a first circuit terminal, a first inductor having first and second terminals, means for connecting said first terminal of said first inductor to said second terminals of said first and fourth switching means, a second inductor having first and second terminals, means for connecting said first terminal of said second inductor to said second terminals of said second and sixth switching means,
means for connecting together said second terminals of said first and second inductors to define a second circuit terminal,
a capacitor having first and second terminals,
means for connecting said first terminal of said capacitor to said first terminal of said fourth switching means and said second terminal of said third switching means, and
means for connecting said second terminal of said capacitor to said first terminal of said sixth switching means and said second terminal of said fifth switching means,
a first diode having first and second terminals,
means for connecting said first terminal of said first diode to said first terminal of said first inductor,
a second diode having first and second terminals,
means for connecting said first terminal of said second diode to said first terminal of said second inductor, and
means for connecting said second terminals of said first and second diodes to define a third circuit terminal.

32. A system as in claim 31 wherein said means for connecting said first terminal of said second inductor to said second terminals of said second and sixth switching means includes a third inductor and wherein said means for connecting said first terminal of said first inductor to said second terminals of said first and fourth switching means includes a fourth inductor.

33. A system as in claim 31 further including a snubbing circuit connected between the first and second terminals of said first, second, fourth and sixth switching means each snubbing circuit including a resistor having first and second terminals, a snubbing diode having a first terminal connected to said first terminal of said resistor and a second terminal connected to said second terminal of said resistor, and a snubbing capacitor connected to said first terminals of said resistor and snubbing diode.

34. A system as in claim 31 further including a further capacitor connected between said first and third circuit terminals and a serially connected capacitor and resistor also connected between said first and third circuit terminals.

35. A system as in claim 34 further including means ofr alternately applying a signal to the gate terminals of said first and second switching means to complete said current path so that said first and second switching means alternately conduct current for applying signals to the gate terminals of said fourth and fifth switching means following application of a signal to the gate terminal of said switching means to back bias said first switching means and interrupt the current path through said first switching means and for applying signals to the gate terminals of said third and sixth switching means following application of a signal to the gate terminal of said second switching means to back bias said second switching means and interrupt the current path through said second switching means.

36. A system as in claim 31 comprising:

a multivibrator producing at an output thereof, a signal alternately shifting between a first and second electrical condition.
a delay circuit connected to the output of said multivibrator for receiving signal and producing a further signal alternately shifting between first and second electrical condition delayed in time with respect to the received signal,
logic means connected to said delay circuit for receiving further signal, and producing a first enable signal when said further signal shifts from said first to second condition and a second enable signal when said further signal shifts from said second to said first condition,
means connected to said logic means for receiving said second enable signal and for causing said second electronic switch means to be rendered conductive when said second enable signal is received, first flip-flop means connected to said delay circuit for receiving said further signal and for shifting from a first to second output condition when said further signal shifts from said first to said second condition,
second flip-flop means connected to said delay circuit for receiving said further signal and for shifting from a first to second output condition when said further signal shifts from said second to said first condition,
means connected to said first flip-flop means for causing said first flip-flop means to shift from said second to said first output condition a given time following shift of said first flip-flop means from said second condition, and
means connected to said second flip-flop means for causing said second flip-flop means to shift from said second to said first output condition a given time following shift of said second flip-flop means from said first to said second condition.

37. A system as in claim 36 further including means connected to said first flip-flop means for causing said first electronic switch means to be rendered non-conductive when said first flip-flop means shifts from said second to said first output condition and means connected to said second flip-flop means for causing said second electronic switch to be rendered non-conductive when said second flip-flop means shifts from said second to said first output condition.

38. A circuit as in claim 37 further including:
means for receiving an enable signal,
delay circuit means for receiving said enable signal and producing a delayed enable signal,
further delay circuit means for receiving said delayed enable signal and produced a further delayed enable signal, and
logic means connecting said delay circuit means to said means for causing said first switch to be rendered non-conductive and to said means for causing said second switch to be rendered non-conductive for preventing said first and second switches from being rendered non-conductive.

39. A circuit as in claim 36 further including logic means connected to said first flip-flop means and to the output of said multivibrator for receiving said signal at the output thereof and for causing said first flip-flop means to shift from said second to said first output condition when said signal received from said multivibrator shifts from said first to said second condition if said first flip-flop means has not previously been shifted from said first to second output condition and logic means connecting said second flip-flop means to the output of said multivibrator for receiving said signal at the output thereof and for causing said second flip-flop means to shift from said second to said first output condition when said signal received from said multivibrator shifts from said second to said first output condition if said second flip-flop means has not previously been shifted from said first to second output condition.

40. An electrical power control system for an electrically powered vehicle having a motor for driving the vehicle along the earth's surface, manual control means for varying the speed of the vehicle, electrical energy storage means having terminals for producing a direct current output voltage and for receiving electrical energy to recharge said storage means and means for receiving energy from an external voltage source comprising:

chopper circuit means for receiving at one terminal an imput direct current voltage and producing at a second terminal a direct current voltage output including means for controlling the magnitude of said direct current output voltage, switch means for connecting said chopper circuit between said terminals of said electrical energy storage means and said motor for supplying electrical energy to said motor to drive said vehicle along the earth's surface, means for producing a first signal which varies as a function of the position of said manual control means, means for producing a second signal which varies as a function of motor current, means for comparing said first and second signals and producing a further signal which varies as a function of the difference between said first and second signals, and means for controlling said chopper circuit, to control energy transfer, as a function of said further signal.

41. A system as in claim 40 wherein said chopper circuit includes:

first electronic switching means having first and second switch terminals and a gate terminal so that a current path is completed between said first and second terminals when a given voltage signal is applied to said gate terminal and is interrupted when a given back bias voltage is applied between said first and second terminals, second electronic switching means having first and second switch terminals and a gate terminal so that a current path is completed between said first and second terminals when a given voltage signal is applied to said gate terminal and is interrupted when a given back bias voltage is applied between said first and second terminals, third electronic switching means having first and second switch terminals and a gate terminal so that a current path is completed between said first and second terminals when a given voltage signal is applied to said gate terminal, means for connecting together said first terminal of said first switching means to said first terminal of said third switching means, fourth electronic switching means having first and second switch terminals and a gate terminal so that a current path is completed between said first and second terminals when a given voltage signal is applied to said gate terminal, means for connecting said second terminal of said fourth switching means to said second terminal of said first switching means, fifth electronic switching means having first and second switch terminals and a gate terminal so that a current path is completed between said first and second terminals when a given voltage signal is applied to said gate terminals, means for connecting said first terminal of said second switching means to said first terminal of said fifth switching means, sixth electronic switching means having first and second switch terminals and a gate terminal so that a current path is completed between said first and second terminals when a given voltage signal is applied to said gate terminal, means for connecting said second terminal of said second switching means.

42. A system as in claim 41 further including:

means for connecting together said first terminals of said first, second, fifth and sixth switching means to define a first circuit terminal, a first inductor having first and second terminals, means for connecting said first terminal of said first inductor to said second terminals of said first and fourth switching means, a second inductor having first and second terminals, means for connecting said first terminal of said second inductor to said second terminals of said second and sixth switching means, means for connecting said second terminals of said first and second inductors to define a second circuit terminal, a capacitor having a first and second terminals means for connecting said first terminal of said capacitor to said first terminal of said fourth switching means and said second terminal of said third switching means, and means for connecting said second terminal of said capacitor to said first terminal of said sixth switching means and said second terminal of said fifth switching means, a first diode having first and second terminals, means for connecting said first terminal of said first diode to said first terminal of said first inductor, a second diode having first and second terminals, means for connecting said first terminal of said second diode to said first terminal of said second inductor, and means for connecting said second terminals of said first and second diodes to define a third circuit terminal.

43. A system as in claim 42 wherein said means for connecting said first terminal of said second inductor to said second terminals of said second and sixth switching means includes a third inductor and wherein said means for connecting said first terminal of said first inductor to said second terminals of said first and fourth switching means includes a fourth inductor.

44. A system as in claim 42 further including a snubbing circuit connected between the first and second terminals of said first, second, fourth and sixth switching means each snubbing circuit including a resistor having first and second terminals, a snubbing diode having a first terminal connected to said first terminal of said resistor and a second terminal connected to said second terminal of said resistor and a second terminal connected to said second terminal of said resistor, and a snubbing capacitor connected to said first terminals of said resistor and snubbing diode.

45. A system as in claim 42 further including a further capacitor connected between said first and third circuit terminals and a serially connected capacitor and resistor also connected between said first and third circuit terminals.

46. A system as in claim 42 further including a voltage source connected between said first and third circuit terminals and a load connected between second and third circuit terminals.

47. A system as in claim 42 further including means for alternately applying a signal to the gate terminals of said first and second switching means to complete said current path so that said first and second switching means alternately conduct current for applying signals to the gate terminals of said fourth and fifth switching means following application of a signal to the gate terminal of said first switching means to back bias said first switching means and interrupt the current path through said first switching means and for applying signals to the gate terminals of said third and sixth switching means following application of a signal to the gate terminal of said second switching means to back bias said second switching means and interrupt the current path through said second switching means.

48. A system as in claim 42 further including:
a multivibrator producing at an output thereof, a signal alternately shifting between a first and second electrical condition,
a delay circuit connected to the output of said multivibrator for receiving signals and producing a further signal alternately shifting between first and second electrical condition delayed in time with respect to the received signal,
logic means connected to said delay circuit for receiving further signal, and producing a first enable signal when said further signal shifts from said first to second condition and second enable signal when said further signal shifts from said second to said first condition,
means connected to said logic means for receiving said second enable signal and for causing said second electronic switch means to be rendered conductive when said second enable signal is received, first flip-flop means connected to said delay circuit for receiving said further signal and for shifting from a first to second output condition when said further signal shifts from said first to said second condition,
second flip-flop means connected to said delay circuit for receiving said further signal and for shifting fromma first to second output condition when said further signal shifts from said second to said first condition,
means connected to said first flip-flop means for causing said first flip-flop means to shift from said second to said first output condition a given time following shift of said first flip-flop means from said first to said second condition, and
means connected to said second flip-flop means for causing said second flip-flop means to shift from said second to said first output condition a given time following shift of said second flip-flop means from said first to said second condition.

49. A system as in claim 48 further including means connected to said first flip-flop means for causing said first electronic switching means to be rendered non-conductive when said first flip-flop means shifts from said second to said first output condition and means connected to said second flip-flop means for causing said second electronic switching means to be rendered non-conductive when said second flip-flop means shifts from said second to said first output condition.

50. A circuit as in claim 49 further including:
means for receiving an enable signal,
delay circuit means for receiving said enable signal and producing a delayed enable signal,
futher delay circuit means for receiving said delayed enable signal and produced a further delayed enable signal,
logic means connecting said further delay circuit means to said means for causing said first switching means to be rendered conductive and to said means for causing said second switching means to be rendered conductive for preventing said first and second switching means from being rendered conductive until said further delay circuit means produces said further delayed signal, and
logic means connecting said delay circuit means to said means for causing said first switching means to be rendered non-conductive and to said means for causing said second switching means to be rendered non-conductive for preventing said first and second switching means from being rendered non-conductive.

* * * * *